US012041632B2

(12) United States Patent
Awad et al.

(10) Patent No.: US 12,041,632 B2
(45) Date of Patent: *Jul. 16, 2024

(54) COMMUNICATION SYSTEM

(71) Applicant: NEC Corporation, Tokyo (JP)

(72) Inventors: Yassin Aden Awad, Uxbridge (GB); Yukio Haseba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 115 days.

This patent is subject to a terminal disclaimer.

(21) Appl. No.: 17/714,442

(22) Filed: Apr. 6, 2022

(65) Prior Publication Data

US 2022/0232540 A1 Jul. 21, 2022

Related U.S. Application Data

(63) Continuation of application No. 16/074,834, filed as application No. PCT/JP2017/003700 on Feb. 2, 2017, now Pat. No. 11,330,574.

(30) Foreign Application Priority Data

Feb. 5, 2016 (GB) ...................... 1602150

(51) Int. Cl.
*H04W 72/23* (2023.01)
*H04L 5/00* (2006.01)
(Continued)

(52) U.S. Cl.
CPC .......... *H04W 72/23* (2023.01); *H04L 5/0053* (2013.01); *H04W 4/70* (2018.02); *H04W 72/0446* (2013.01); *H04L 5/0005* (2013.01)

(58) Field of Classification Search
CPC ... H04W 72/23; H04W 4/70; H04W 72/0446; H04L 5/0053; H04L 5/0005; H04L 5/0094; H04L 5/00
See application file for complete search history.

(56) References Cited

U.S. PATENT DOCUMENTS 10,070,478 B2   9/2018   He ..................... H04L 5/0053
2010/0173642 A1  7/2010  Iwai ................... H04J 13/0055
                                                    455/450
(Continued)

FOREIGN PATENT DOCUMENTS

CN    102204381 A    9/2011
CN    103813464 A    5/2014
(Continued)

OTHER PUBLICATIONS

"LS on RRC parameters for LTE eMTC", 3GPP TSG-RAN WG1 Meeting #83, R1-157891, Nov. 15-22, 2015, Anaheim, USA.
(Continued)

*Primary Examiner* — Ajit Patel
*Assistant Examiner* — Wilfred Thomas
(74) *Attorney, Agent, or Firm* — Sughrue Mion, PLLC

(57) ABSTRACT

A system is disclosed in which a base station defines a search space, in which a communication device can search for control information. The search space is characterised by at least first information which is related to a starting subframes of a plurality of portions of the search space and second information which is related to a periodicity between respective starting subframes, each portion representing a different candidate for the transmission of control information. The base station obtains a parameter indicating both the initial starting subframe and the periodicity and transmits the generated parameter to the communication device.

10 Claims, 9 Drawing Sheets

(51) Int. Cl.
*H04W 4/70* (2018.01)
*H04W 72/0446* (2023.01)

(56) References Cited

U.S. PATENT DOCUMENTS

| | | | |
|---|---|---|---|
| 2011/0075624 A1 | 3/2011 | Papasakellariou | H04W 24/00 370/329 |
| 2011/0194525 A1 | 8/2011 | Nishio et al. | |
| 2012/0076025 A1 | 3/2012 | Barbieri | H04W 72/06 370/252 |
| 2012/0082130 A1 | 4/2012 | Xue | H04L 6/0094 370/330 |
| 2013/0044605 A1 | 2/2013 | Lee | H04L 27/2628 370/241 |
| 2013/0088972 A1 | 4/2013 | Kim et al. | |
| 2013/0235780 A1 | 9/2013 | Kim | H04W 72/0473 370/311 |
| 2014/0036828 A1 | 2/2014 | Papasakellariou | H04W 24/00 370/329 |
| 2014/0177556 A1 | 6/2014 | Pan | H04L 1/0038 370/329 |
| 2014/0211750 A1 | 7/2014 | Larsson | H04W 68/02 370/330 |
| 2014/0293924 A1 | 10/2014 | Wang et al. | |
| 2015/0003393 A1 | 1/2015 | Xia | H04W 8/06 370/329 |
| 2015/0036631 A1 | 2/2015 | Yang | H04L 27/2601 370/329 |
| 2015/0078224 A1 | 3/2015 | Xiong et al. | |
| 2016/0088651 A1 | 3/2016 | Yu | H04L 5/0053 370/329 |
| 2016/0380742 A1 | 12/2016 | Suzuki | H04L 5/14 370/280 |
| 2017/0290016 A1 | 10/2017 | Yi | H04L 5/0053 |
| 2017/0347335 A1 | 11/2017 | Yi | H04W 76/10 |
| 2018/0048984 A1* | 2/2018 | Park | H04W 4/06 |
| 2018/0049247 A1* | 2/2018 | Park | H04W 4/06 |
| 2018/0167916 A1 | 6/2018 | Zhang | H04W 72/1284 |
| 2018/0249440 A1* | 8/2018 | Zhang | H04W 76/45 |
| 2018/0279265 A1 | 9/2018 | Shimezawa | H04L 5/0063 |
| 2019/0013848 A1 | 1/2019 | Xiong | H04L 5/005 |

FOREIGN PATENT DOCUMENTS

| | | |
|---|---|---|
| CN | 104081850 A | 10/2014 |
| CN | 104518843 A | 4/2015 |
| CN | 104754741 A | 7/2015 |
| CN | 104811409 A | 7/2015 |
| EP | 2 458 908 A1 | 5/2012 |
| RU | 2 518 400 C2 | 8/2014 |
| WO | 2010/093006 A1 | 8/2010 |
| WO | 2012/093594 A1 | 7/2012 |
| WO | 2013/055143 A2 | 4/2013 |
| WO | 2016/039351 A1 | 3/2015 |
| WO | 2015/050999 A1 | 4/2015 |
| WO | 2015/079972 A1 | 6/2015 |

OTHER PUBLICATIONS

"3rd Generation Partnership Project; Technical Specification Group Radio Access Network; Evolved Universal Terrestrial Radio Access (E-UTRA); Physical layer procedures (Release 13)", 3GPP TS 36.213 V13.0.0, Dec. 2015.
"Introduction of further LTE Physical layer Enhancements for MTC", 3GPP Draft 36213-C70_S00-S09-EMTC CR_R1-157926, Motorola mobility, Jan. 1, 2016.
"Addition of low complexity UEs and coverage enhancement features", 3GPP Draft; 36331_CR2003_(REL-13)_R2-161086, Ericson, Feb. 2016.
Search Report for corresponding GB 1602150.3, dated Jul. 8, 2016.
Written Opinion for PCT/JP2017/003700, dated Apr. 19, 2017.
Internationa Search Report for PCT/JP2017/003700, dated Apr. 19, 2017.
MCC Support, "Draft Report of 3GPP TSG RAN WGl Meeting #83 v0.1.0 (Anaheim, USA, Nov. 15-22, 2015)", Comment, 3GPP TSG RAN WG1 Meeting #84, St. Julian's, Malta, Feb. 15-19, 2016( pp. 1-122).
Communication dated Feb. 20, 2019 from Russian Patent Office in counterpart RU Application No. 2018128398/07(045551).
Communication dated Mar. 24, 2020, from the Japanese Patent Office in Application No. 2018-557510.
Communication dated Apr. 3, 2020, issued by the Korean Intellectual Property Office in application No. 10-2018-7022246.
Samsung, "Study on specification impact for downlink due to TTI shortening", 3GPP TSG RAN WG1 Meeting #83, Anaheim, USA, Nov. 15-22, 2015, R1-156818, pp. 1-5.
Communication dated Jun. 29, 2020, from the Intellectual Property Office of India in Application No. 201817028562.
Communication dated Aug. 4, 2020 from the China National Intellectual Property Administration in Application No. 201780010181.8.
Korean Office Action for KR Application No. 10-2018-7022246 dated Dec. 30, 2020 with English Translation.
Samsung, "M-PDCCH Starting Subframe and Repetition Level", 3GPP TSG RAN WG1 #82bis, R1-155426, pp. 1-3, Sep. 25, 2015, Sweden.
Chinese Office Action for CN Application No. 201780010181.8 dated Oct. 9, 2021 with English Translation.
CN Office Action for Chinese Patent Application No. 202210704445. 2, mailed on Jan. 17, 2024 with English Translation.

* cited by examiner

COMMUNICATION SYSTEM

CROSS-REFERENCE TO RELATED APPLICATIONS

The present application is a continuation application of U.S. patent application Ser. No. 16/074,834 filed on Aug. 2, 2018, which is a National Stage Entry of international application PCT/JP2017/003700 filed on Feb. 2, 2017, which claims the benefit of priority from United Kingdom Patent Application 1602150.3 filed on Feb. 5, 2016, the disclosures of all of which are incorporated in their entirety by reference herein.

TECHNICAL FIELD

The present invention relates to mobile communication devices and networks, particularly but not exclusively those operating according to the 3rd Generation Partnership Project (3GPP) standards or equivalents or derivatives thereof. The invention has particular although not exclusive relevance to the Long Term Evolution (LTE) of UTRAN (called Evolved Universal Terrestrial Radio Access Network (E-UTRAN)).

BACKGROUND ART

In a mobile (cellular) communication network, mobile devices (also known as User Equipment (UE) or mobile terminals, such as mobile telephones) communicate with remote servers or with other mobile devices via base stations. In their communication with each other, mobile devices and base stations use licensed radio frequencies, which are typically divided into frequency bands and/or time blocks. Depending on various criteria (such as the amount of data to be transmitted, radio technologies supported by the mobile device, expected quality of service, subscription settings, etc.), each base station is responsible for controlling the transmission timings, frequencies, transmission powers, modulations, etc. employed by the mobile devices attached to the base station. The scheduling decision can be modified every transmission time interval, e.g. as frequently as 1 ms. In order to minimise disruption to the service and to maximise utilisation of the available bandwidth, the base stations continuously adjust their own transmission power and also that of the mobile devices. Base stations also assign frequency bands and/or time slots to mobile devices, and also select and enforce the appropriate transmission technology to be used between the base stations and the attached mobile devices. By doing so, base stations also reduce or eliminate any harmful interference caused by mobile devices to each other or to the base stations.

Using orthogonal frequency-division multiplexing (OFDMA), the mobile devices are allocated blocks comprising a specific number of subcarriers for a predetermined amount of time. These are referred to as physical resource blocks (PRBs) in the LTE specifications. PRBs thus have both a time and a frequency dimension. One PRB consists of 12 consecutive subcarriers for one slot (0.5 ms) in duration. The PRB is the smallest element of resource allocation assigned by the base station. LTE radio frames, or system frames, are divided into 10 subframes, each subframe being 1.0 ms long. Each subframe is further divided into two slots, each of 0.5 ms in duration. Slots consist of either 6 or 7 ODFM symbols, depending on whether the normal or extended cyclic prefix is employed.

The base station's scheduling decisions (i.e. scheduling assignments for uplink and downlink communication) are conveyed to individual mobile devices on the so-called Physical Downlink Control Channel (PDCCH) or the Enhanced PDCCH (EPDCCH). The information carried on the (E)PDCCH is referred to as downlink control information (DCI). The format of the DCI can vary depending on the purpose of the control message.

Thus, in order to be able to communicate via the base stations, mobile devices need to monitor the control channels operated by the base stations and look for the DCI. Physical control channels, such as the (E)PDCCH, are transmitted on an aggregation of one or several consecutive Control Channel Elements (CCEs), where a control channel element corresponds to nine Resource Element Groups (REGs). Each REG has four Resource Elements (REs).

When a mobile device is first switched on or when it arrives in an area served by a base station, it will look for the location of the control channels in the frequency band(s) used by that base station. For example, the mobile device needs to check all possible combinations of locations and formats of the (E)PDCCH, and the DCI formats and act on those messages. Since the decoding of all possible combinations would require the mobile device to make many (E)PDCCH decoding attempts 3GPP defined an alternative approach for LTE, according to which, for each mobile device served by the base station, a limited set of CCE locations are set where an EPDCCH may be placed. The set of CCE locations in which the mobile device may find its EPDCCH can be considered as a 'search space', for example, as described in section 9.1.1 of the 3GPP Technical Specification (TS) 36.213 V13.0.1.

In LTE the search space has a different size for each EPDCCH format. Moreover, separate dedicated and common search spaces are defined, where a dedicated search space is configured for each UE individually, while all mobile devices are informed of the extent of the common search space.

Recent developments in telecommunications have seen a large increase in the use of machine-type communications (MTC) devices which are networked devices arranged to communicate and perform actions without human assistance. Examples of such devices include smart meters, which can be configured to perform measurements and relay these measurements to other devices via a telecommunication network. Machine-type communication devices are also known as machine-to-machine (M2M) communication devices. Moreover, the so-called Internet-of-Things (IoT) devices may also be referred to as MTC devices.

MTC devices connect to the network (after performing an appropriate random access procedure, if necessary) whenever they have data to send to or receive from a remote 'machine' (e.g. a server) or user. MTC devices use communication protocols and standards that are optimised for mobile telephones or similar user equipment (as described above). However, MTC devices, once deployed, typically operate without requiring human supervision or interaction, and follow software instructions stored in an internal memory. MTC devices might also remain stationary and/or inactive for a long period of time. The specific network requirements to support MTC devices have been dealt with in 3GPP TS 22.368 V13.1.0, the contents of which are incorporated herein by reference.

Since the Release 13 (Rel-13) version of the 3GPP standards, MTC devices are allowed to support only a limited bandwidth (typically 1.4 MHz) compared to the total LTE bandwidth. MTC devices may also have fewer/simplified components. This allows such 'reduced bandwidth' MTC devices to be made more economically compared to other UEs supporting a larger bandwidth and/or having more complicated components.

The lack of network coverage (e.g. when deployed indoors), in combination with the often limited functionality of MTC devices, can result in such MTC devices having a low data rate and therefore there is a risk of some messages or channels, such as the (E)PDCCH, not being received by an MTC device. In order to mitigate this risk, it has been proposed to increase the coverage of the EPDCCH to support such MTC devices. This is achieved by the repetition of the same EPDCCH information (e.g. DCI) across multiple (e.g. two, three, four) subframes. In other words, for coverage enhancement (CE) purposes, the base station duplicates the EPDCCH information in the time domain (the base station re-transmits the same EPDCCH information in one or more subframes subsequent to the subframe in which that EPDCCH information is first sent). A coverage enhanced MTC device can be configured to combine the multiple copies of the (same) EPDCCH information received in the multiple subframes, and after combining the received information, the coverage enhanced MTC device is more likely to be able to decode the EPDCCH successfully than based on a single copy of the EPDCCH information.

In LTE, the so-called M-PDCCH is a variant of the (E)PDCCH that is specifically used for MTC UEs to meet their narrow bandwidth/coverage enhancement requirements. In Rel-13, each low complexity (LC) or coverage enhanced (CE) MTC device is required to monitor one or more search spaces on one or more narrowbands from:

a Type0-M-PDCCH common search space (CSS) for Mode A (e.g. no repetitions or CE with a small number of repetitions) that can be used for a Transmit Power Control (TPC) command, "PDCCH order" to initiate random access procedure, and fall back for unicast Physical Downlink Shared Channel (PDSCH)/Physical Uplink Shared Channel (PUSCH) transmissions;

a Type1-M-PDCCH CSS used for scheduling paging transmissions;

a Type2-M-PDCCH CSS used for scheduling random access related messages (such as a random access response (RAR), Msg3 retransmission, and Msg4); and an M-PDCCH UE-specific search space ('UESS', 'UE-SS', or 'USS') used for scheduling unicast PDSCH and PUSCH transmissions.

An LC/CE MTC device is not required to simultaneously monitor the M-PDCCH UESS and the Type1-M-PDCCH common search space, and it is not required to simultaneously monitor the M-PDCCH UESS and the Type2-M-PDCCH common search space.

The starting subframe for each Type1-M-PDCCH common search space is determined from respective locations of paging opportunity subframes (the locations of which are known to both the base station and the mobile devices). The starting subframe(s) for each Type2-M-PDCCH common search space is explicitly indicated via an MTC specific system broadcast (in a MTC specific system information block—'MTC-SIB') using 3-bits. The starting subframe for each M-PDCCH UESS and each Type0-M-PDCCH common search space is configured via higher layers (RRC signalling) using 3-bits.

CITATION LIST

Non Patent Literature nplcit 1: R1-157891 LS on RRC parameters for LTE eMTC
nplcit 2: Chairman's Notes RAN1_83-final
nplcit 3: TS 36.213 V13.0.0

SUMMARY OF INVENTION

Technical Problem

3GPP defined the structure of the M-PDCCH UESS such that the period (number of subframes) between the respective beginnings of (consecutive) starting subframes of (consecutive) search spaces of the UESS can be longer than the time (number of subframes) required for a maximum number of the repetitions (Rmax). Hence, there may be a gap (in time) between two consecutive search spaces of the UESS (e.g. for a particular MTC device), i.e. a gap between the last repetition (last subframe) of one search space and the first transmission in the starting subframe of the next search space. Moreover, it is also expected that there is only a single search space after the starting subframe of a particular UESS (i.e. without any intervening search spaces). However, the period (number of subframes) between the respective beginnings of (consecutive) starting subframes of (consecutive) search spaces cannot be less than the actual duration (number of subframes) of the maximum number of repetitions (Rmax). It is foreseen that the value Rmax=1 (single transmission or 'repetition' without further repetition) may also be supported in the future. 3GPP also agreed that the possible starting subframes for an M-PDCCH search space may be defined regardless of the validity/invalidity of the subframe(s) for downlink (DL) transmission.

However, the signalling of the starting subframe for a UESS of a particular MTC device is constrained by the number of bits that can be used for that signalling. Specifically, it is expected that a separate (UESS specific) RRC parameter having 3 bits will be used. Further, even when a particular MTC-device is aware of the starting subframe of its UESS there is no efficient mechanism by which the MTC device can be made aware of the subframes of its subsequent search space (i.e. following the gap) without additional signalling that is undesirable in the context of MTC devices.

The present invention seeks to provide systems, devices and methods which at least partially address the above issues, and specifically, ways in which the starting subframes for M-PDCCH UESS, Type0-M-PDCCH CSS and Type1-M-PDCCH CSS may be signalled for Rel-13 MTC devices.

Solution to Problem

In one aspect, the invention provides a base station for communicating with a plurality of communication devices in a cellular communication system, the base station comprising: a processor configured to: define a search space in which at least one communication device, of said plurality of communication devices, can search for control information, wherein the search space is characterised by at least first information which is related to a starting subframe representing a start of the search space and second information which is related to a periodicity representing a time period between respective starting subframes of a plurality of portions of the search space, each portion representing a different candidate for transmission of control information; and obtain a parameter configured to indicate both the starting subframe and the periodicity to the at least one communication device; and a transceiver configured to transmit said parameter to said communication device.

In another aspect, the invention provides a communication device for communicating with a base station of a cellular communication system, the communication device comprising: a transceiver configured to receive a parameter configured to indicate both first information which is related to a starting subframe representing a start of a search space and second information which is related to a periodicity representing a time period between respective starting subframes of a plurality of portions of the search space, each portion representing a different candidate for transmission of control information; and a processor configured to determine, from said received parameter, the search space in which said transceiver can search for control information.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

FIG. 7 illustrates an exemplary starting subframe for combinations of different periodicities and different maximum number of repetitions;

FIG. 8 illustrates an exemplary starting subframe for combinations of different periodicities and different maximum number of repetitions.

DESCRIPTION OF EMBODIMENTS

<Overview>

Figure 1:
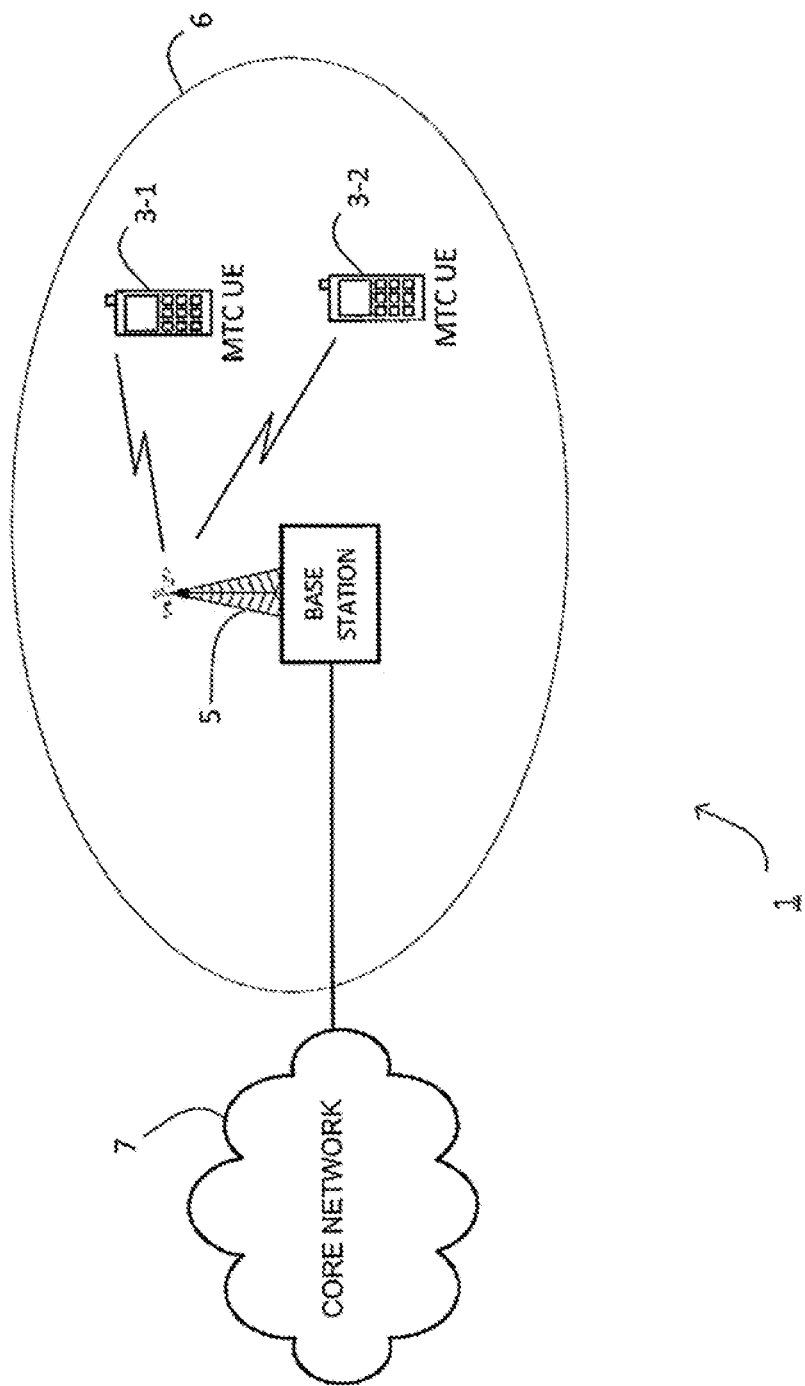
FIG. 1 schematically illustrates a telecommunication system to which example embodiments of the invention may be applied.

FIG. 1 schematically illustrates a mobile (cellular) telecommunication system 1 in which users of mobile communication devices 3 can communicate with other users via base stations 5. In the system illustrated in FIG. 1, the mobile devices 3 are machine-type communication (MTC) devices (or MTC UEs) and the base station 5 shown is an Evolved Universal Terrestrial Radio Access Network (E-UTRAN) base station serving an E-UTRAN cell 6. Such base stations are commonly referred to as eNBs (Evolved NodeBs). As those skilled in the art will appreciate, whilst two mobile communication devices 3, one base station 5, and one cell 6 are shown in FIG. 1 for illustration purposes, the system, when implemented, will typically include other base stations (each serving one or more cells) and other communication devices (e.g. MTC devices, mobile telephones, and/or other user equipment).

The base station 5 transmits an M-PDCCH in its cell 6 (along with a regular PDCCH/EPDCCH, if appropriate) for scheduling the resources of the cell 6 to individual MTC device 3 (as and when needed). The M-PDCCH is transmitted for the MTC devices 3 on an aggregation of one or several enhanced control channel elements (eCCEs). It will be appreciated that the M-PDCCH may be transmitted on the same set of eCCE(s) for all MTC devices 3 or the M-PDCCH may be transmitted for a particular MTC device 3 (or a particular group of MTC devices 3) on MTC device specific (or group specific) eCCE(s).

For each MTC device 3, the M-PDCCH is repeated in accordance with the higher layer parameter ('R') applicable for that MTC device 3. It will be appreciated that the number of repetitions can have a value selected from the set of R {1, 2, 4, 8, 16, 32, 64, 128, 256}.

In order to be able to receive the M-PDCCH, each MTC device 3 is configured to monitor one or more search spaces, including a Type0-M-PDCCH CSS, a Type1-M-PDCCH CSS, a Type2-M-PDCCH CSS, and/or an M-PDCCH UESS. It will be appreciated that the search space extends over a plurality of (consecutive) subframes in dependence on the number of repetitions.

The base station 5 is configured to determine the appropriate UESS for each MTC device 3 (if any) depending on various system parameters and e.g. the number of repetitions required for that MTC device 3. The UESS can be thought of as a set of 'MPDCCH candidates'. The MPDCCH candidates can be envisaged as comprising a set of recurring search spaces (or candidate search spaces), or as comprising recurring (candidate) portions of a single search space. The UESS is characterised by a starting subframe (e.g. the first identified subframe of the UESS) and a period (T) between starting subframes of the subsequent search spaces (or subsequent portions of the single search space).

In this system, the base station 5 is configured to define the starting subframe for the UESS of a particular MTC device 3 (MTC UE) in relation to the system frame number (SFN) and the subframe number. A three bit parameter is signalled to each MTC device 3 to indicate the starting subframe of the M-PDCCH UESS for that MTC device or Type0-common search space (e.g. M-PDCCH-startSF-UESS or M-PDCCH-startSF-CSS-RA).

The MTC device can determine the locations of each starting subframe k (of each recurring search space) from the location of the subframe k0 (the first identified subframe of the UESS) of the configured using higher layer signalling. The values of k are given by:

$k = k_b$ where $k_b$ is the $b^{th}$ consecutive LC/CE DL subframe from k0, and $$b = u \cdot rj, \text{ and } u = 0, 1, \ldots \frac{R_{max}}{rj} - 1, \text{ and } j \in \{1, 2, 3, 4\}, \quad \text{[Math. 1]}$$

where for M-PDCCH UE-specific search space, and Type0-common search space, k0 is given by the higher layer parameter M-PDCCH-startSF-UESS (or M-PDCCH-startSF-CSS-RA), $R_{max}$ is given by a higher layer parameter M-PDCCH-NumRepetition, and r1, r2, r3, r4 are given in Table 1.

TABLE 1

Determination of repetition levels for UESS

| $R_{max}$ | r1 | r2 | r3 | r4 |
|---|---|---|---|---|
| 1 | 1 | — | — | — |
| 2 | 1 | 2 | — | — |
| 4 | 1 | 2 | 4 | — |
| <=8 | $r_{max}/8$ | $r_{max}/4$ | $r_{max}/2$ | $r_{max}$ |

Figure 7:
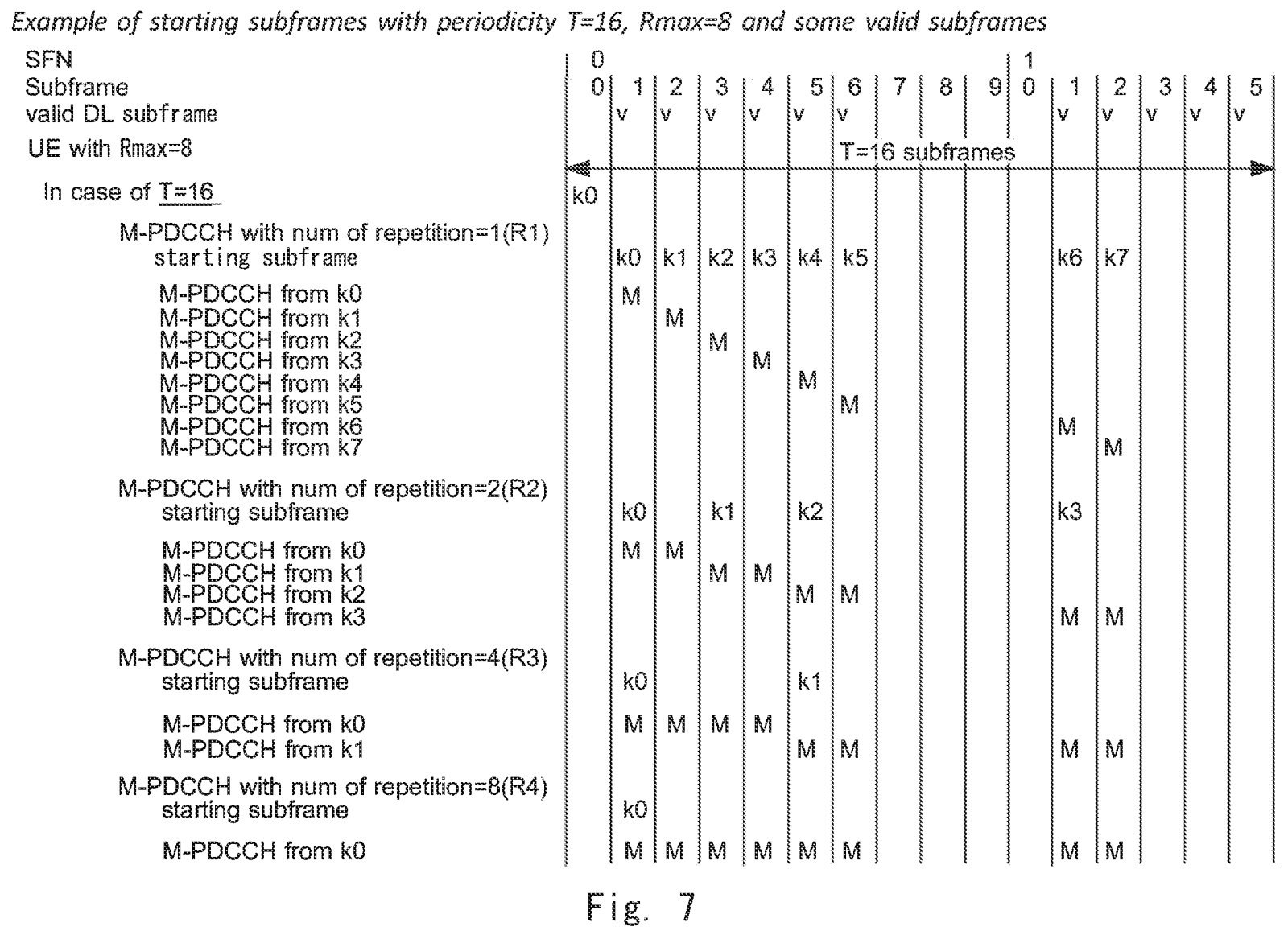
Figure 8:
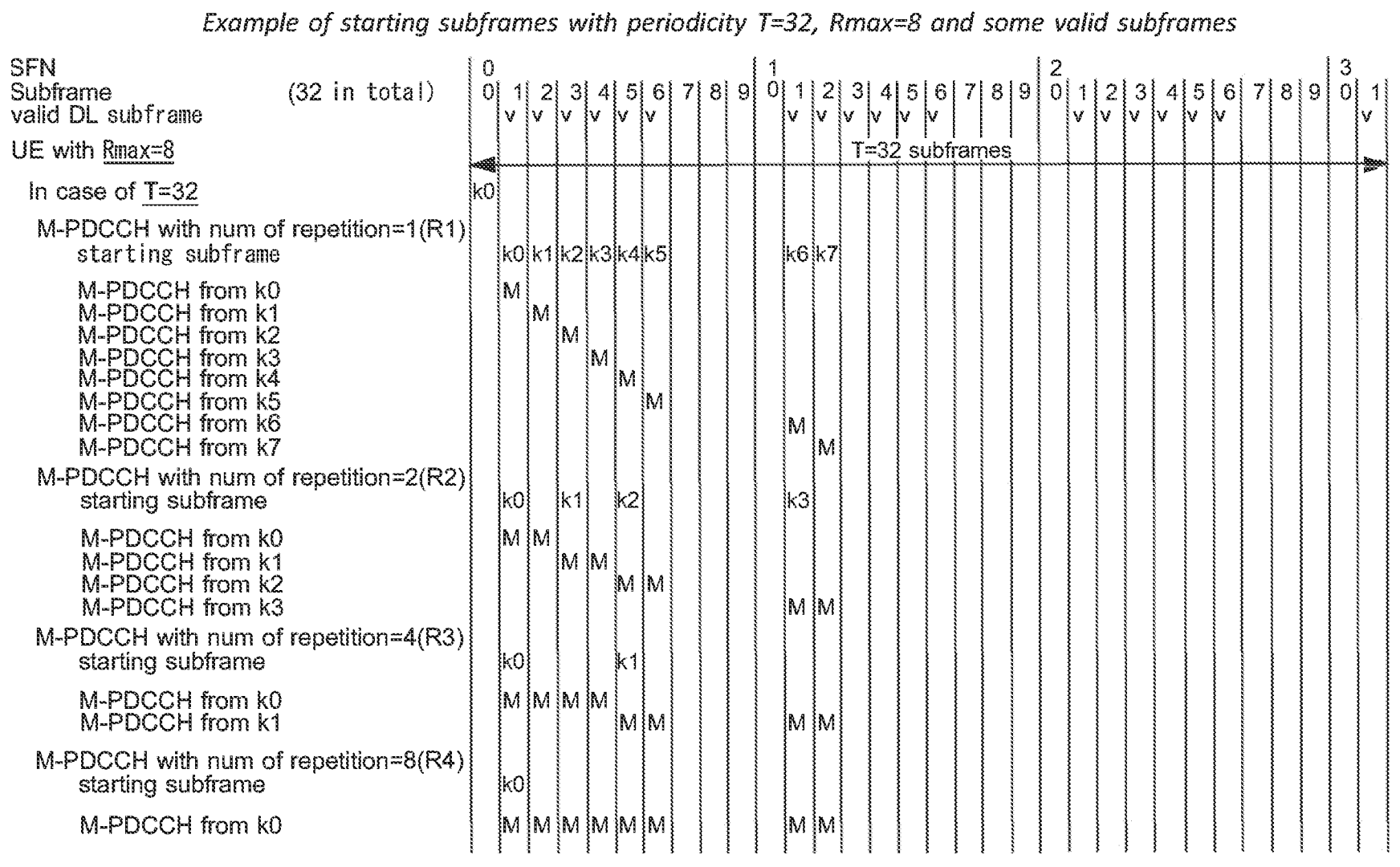

The resulting possible starting subframes ($k_0$ to $k_7$) and corresponding repetitions (indicated by 'M') are illustrated in FIGS. 7 and 8 for various values of periodicities (T) and repetitions (R1 to R4).

Beneficially, the base station 5 uses a periodicity for each UESS that is dependent on the three bit parameter (e.g. M-PDCCH-startSF-UESS), signalled to the respective MTC device 3 associated with that UESS, to indicate the starting subframe of the M-PDCCH UESS. The MTC device 3 is thus able to derive both the starting subframe (relative to a system frame number (SFN)) and the periodicity from the signalled parameter.

Thus, when a particular MTC-device is aware of the starting subframe of its UESS it can efficiently determine the subframes of its subsequent UESS (i.e. following the gap) without additional signalling.

Beneficially, in a first example, the base station 5 defines the applicable periodicity for the M-PDCCH search space by reference to a set of values of 'R' normally used for determining the M-PDCCH repetitions for a particular MTC device 3 (e.g. the set of values R including the values 1, 2, 4, 8, 16, 32, 64, 128, and 256).

In this example, the base station 5 is configured to use a smaller subset of eight of these values normally used for determining the M-PDCCH repetitions thereby allowing the three bit parameter indicating the starting subframe to represent one of the eight possible periodicities. For example, the base station 5 may use the last 8 values from the set of R values (i.e. excluding the value '1'). Hence, each MTC device 3 can be configured, using the three bit parameter, with one of the set of $$T \in \{2,4,8,16,32,64,128,256\} \quad \text{[Math. 2]}$$

It will be appreciated that, whilst this example is particularly simple and efficient, a potential issue may arise when the number of coverage enhancement repetitions is at its maximum (256). Specifically, in this case the periodicity T would need to be set to 256 subframes as well because otherwise the period between search spaces would be less than the possible duration of the M-PDCCH repetitions. However, when there are any invalid downlink subframes within the 256 subframe period these cannot be used for a M-PDCCH repetition and so when the maximum number of repetitions is used (256), the duration of the repetitions would extend beyond, and hence overlap with, the 256 subframe period T between search spaces.

In a variant of this example, therefore, instead of using the highest value from the set of values of 'R' normally used for determining the M-PDCCH repetitions, a higher value (e.g. 512) is used in the set of possible periodicities T $$(\text{i.e. } T \in \{2,4,8,16,32,64,128,512\}). \quad \text{[Math. 3]}$$

In this variation, therefore, when the number of coverage enhancement repetitions is at its maximum (256) the base station can signal, via the three bit parameter indicating the starting subframe, a periodicity T that will be greater than the duration, in subframes, of the repetitions of the M-PDCCH regardless of the presence of invalid downlink subframes. This can therefore be used to ensure that the duration the M-PDCCH repetitions does not extend beyond the period T between search spaces (when at least half the downlink subframes are valid).

Beneficially, in a second example, the base station 5 defines the applicable periodicity for the M-PDCCH search space by reference both to the maximum number of coverage enhancement repetitions, Rmax, for an MTC device and the higher layer three bit parameter to indicate the starting subframe of the M-PDCCH UESS (M-PDCCH-startSF-UESS). Specifically, in this example, one of the possible values of the three bit parameter (e.g. from the set {0, 1, 2, 3, 4, 5, 6, 7}) is configured for a particular MTC device 3 and the M-PDCCH periodicity T is defined as an appropriate function of this value and Rmax (e.g. T=Rmax*(M-PDCCH-startSF-UESS+1)).

However, whilst this second example has benefits in terms of simplicity, when the system frame number (SFN) counter wraps around (on reaching its maximum value which is currently 1024) some of the possible periodicities may result in the starting subframe of a search space coinciding with a repetition of an M-PDCCH of an earlier search space.

In a beneficial variant of this example, therefore, the base station 5 is configured to ensure that the periodicity T is always (or almost always) a sub-multiple of 10240 (i.e. the total number of subframes in a system frame multiplied by the maximum value of the system frame number counter (1024)). Beneficially, this helps periodicities to be avoided that might otherwise result in a search space starting in the middle of a repetition. Specifically, periodicity is defined to reduce the number of factors other than 2 and 5. In this variant a set of eight possible factors (herein denoted 'G') are defined and the M-PDCCH periodicity T is defined as Rmax*G. The choice of G (i.e. the index identifying which of the eight values is to be used) is signalled using the three bit parameter (e.g. M-PDCCH-startSF-UESS) for signalling the starting subframe of the search space.

One possible set of values for G is as follows $$G \in \{1,2,4,5,8,10,16,20\}. \quad \text{[Math. 4]}$$

This set of values can result in one periodicity that is not a factor of 10240

$$(\text{i.e. } G=16, R\text{max}=256 \rightarrow T=4096). \quad \text{[Math. 5]}$$

Another possible set of values for G is as follows $$G \in \{1,2,4,5,8,10,20,40\} \quad \text{[Math. 6]}$$

This avoids all periodicities that are not factors of 10240 but does result in a significantly longer maximum periodicity $$(\text{e.g. } G=40, R\text{max}=256 \rightarrow T=10240) \quad \text{[Math. 7]}$$

<Radio Frame and Resource Grid Structure>

Before discussing detailed embodiments of the present invention, a brief overview is given of the radio frame and resource grid structure currently specified for LTE systems.

Figure 2:
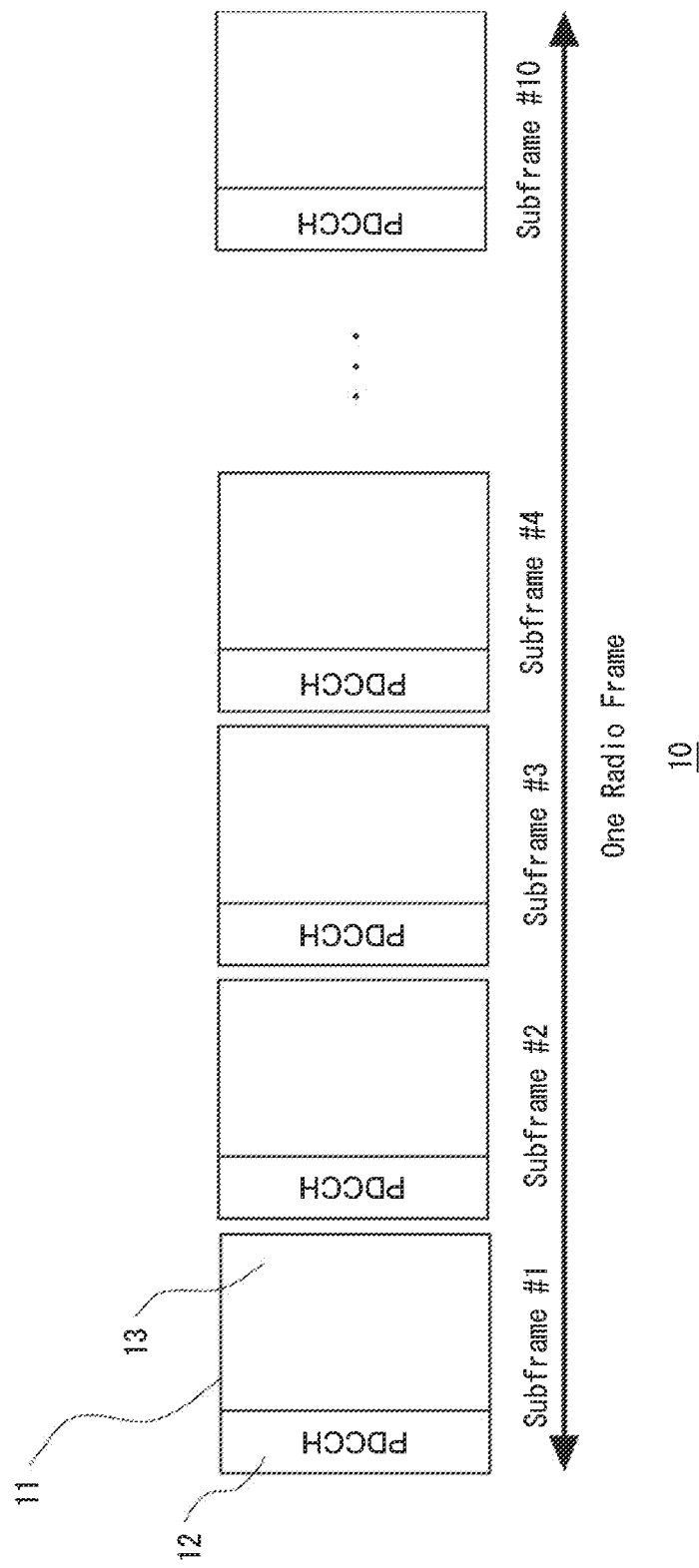
FIG. 2 illustrates a radio frame for the telecommunication system of FIG. 1.

FIG. 2 illustrates a radio frame 10 (or system frame) for the telecommunication system 1 of FIG. 1. The resources of the radio frame 10 are divided into ten subframes 11, in each of which a first part 12 of the subframe 11 may be used to carry a PDCCH (e.g. for legacy devices). Historically, the remainder 13 of each subframe comprises resources used for transmitting a Physical Downlink Shared Channel (PDSCH) and part of which, in the present embodiment, may be used for transmitting an M-PDCCH (or EPDCCH).

Figure 3:
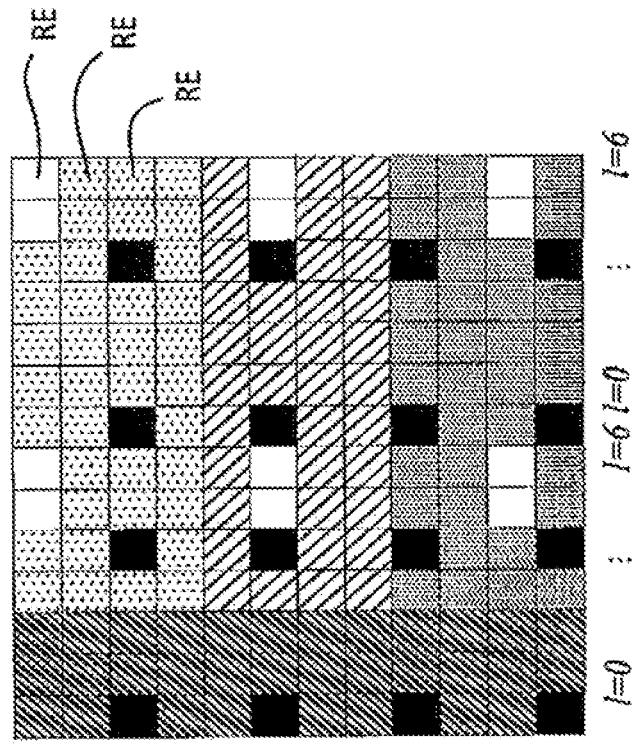
FIG. 3 shows a simplified illustration of a resource grid used in the telecommunication system of FIG. 1.
Figure 3:
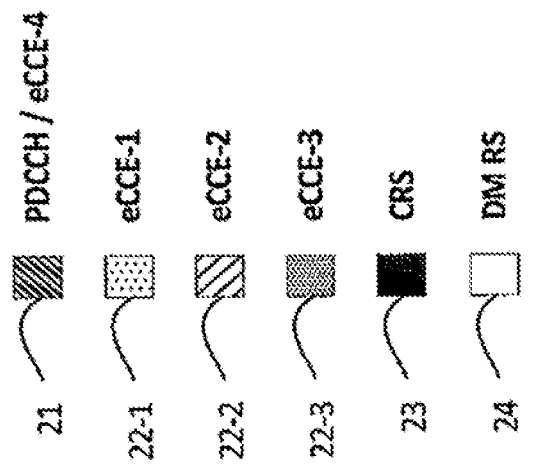

FIG. 3 shows a simplified illustration of a typical resource grid of a PRB pair 20 used in the telecommunication system 1 of FIG. 1. The PRB pair comprises a number of resource elements (RE) defined in time (i.e. in columns corresponding to 'symbols' along the horizontal axis of FIG. 3) and frequency (i.e. in rows corresponding to each 'sub-carrier' along the vertical axis of FIG. 3). Similarly to EPDCCH, each M-PDCCH consists of an aggregation of control channel elements ('eCCEs'). Each eCCE occupies a predefined number of resource elements. Each eCCE starts at a fixed location within the PRB pair 20. In this example, one PRB pair 20 supports three eCCEs 22-1, 22-2 and 22-3. If the first resource elements of the three symbols are not used for a legacy PDCCH then the number of potential eCCEs per PRB pair could be increased to four by using the first three symbols for a fourth eCCE (e.g. for EPDCCH). The PDCCH 21 is carried in the first part of the subframe 20, as shown generally in the left hand side area of the PRB pair 20 of FIG. 3.

Some resource elements of the PRB pair 20 are also used to carry cell reference signals (CRS) 23 and demodulation reference signals (DM RS) 24, both of which are transmitted by the base station 5 periodically, at predetermined intervals and predetermined locations within a PRB pair. These signals are used to provide reference signal levels and to inform the mobile device 3 about the current operation of the base station 5. Resource elements can be transmitted at varying energy levels but the CRS 23 resource elements are always transmitted at a known (e.g. a default) energy level. The mobile device 3 can thus carry out signal quality measurements over the CRS 23 resource elements and, based on these measurements, can indicate to the base station 5 the perceived signal quality of a given frequency band (of a given cell) operated by the base station 5.

In this example, starting from the 4th symbol of the PRB pair, and extending to the last symbol (as seen in FIG. 3), the remaining resource blocks of the resource block pair 20 are divided into the three eCCE areas 22-1 to 22-3.

A search space for a particular MTC device consists of a collection of M-PDCCHs in which to search for control information for that MTC device 3. The MTC device 3 monitors all the M-PDCCHs in its search space in every subframe to detect control information such as scheduling grants from the base station 5. Ideally, the size of the search space should be as small as possible to minimise the processing burden on the MTC device 3.

<Mobile Communication Device (MTC UE)>

Figure 4:
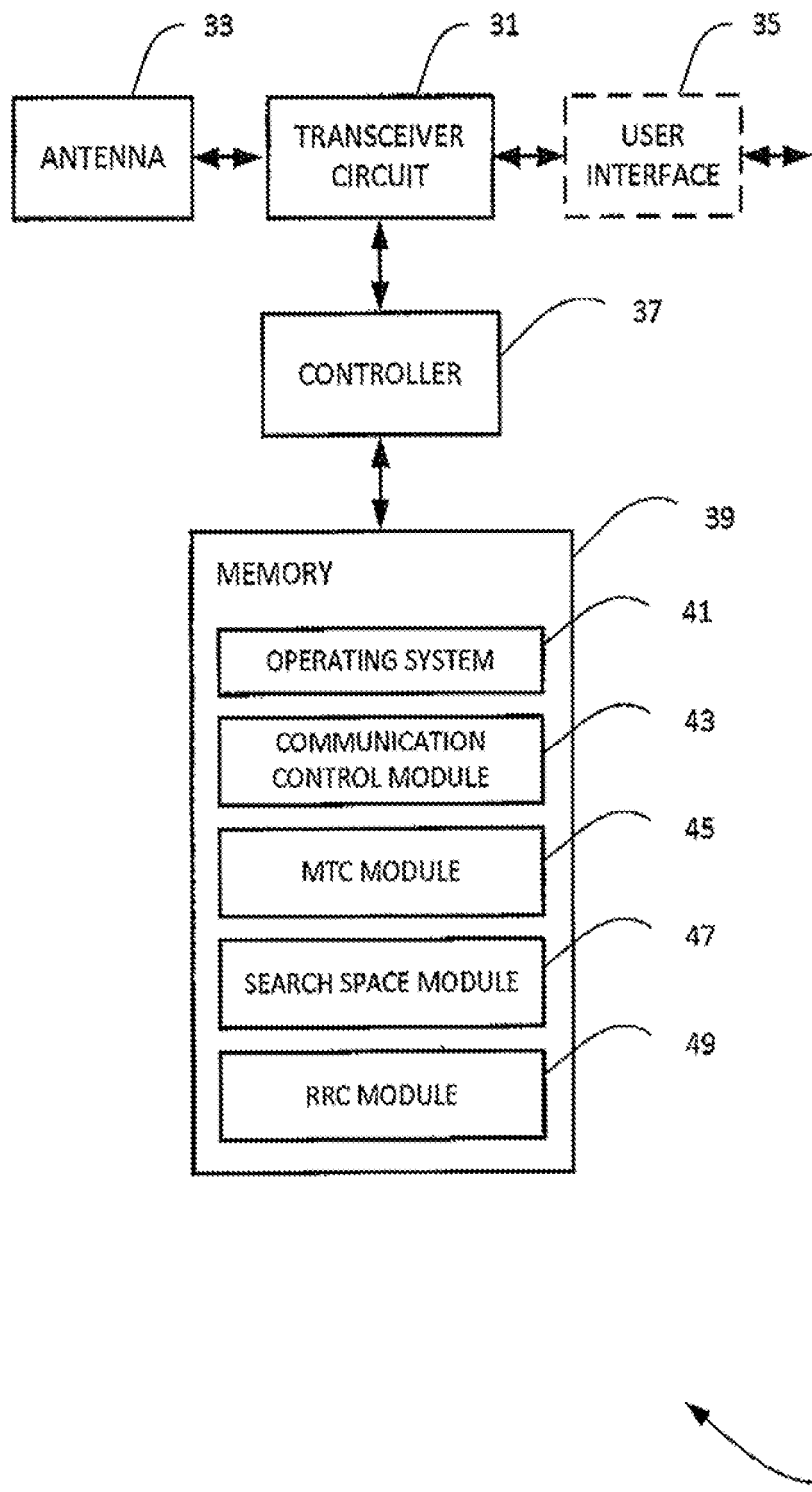
FIG. 4 shows a simplified block diagram of a mobile communication device for the telecommunication system of FIG. 1.

FIG. 4 is a block diagram illustrating the main components of the mobile communication device 3 (MTC device/MTC UE) shown in FIG. 1. The MTC device 3 comprises a transceiver circuit 31 which is operable to transmit signals to, and to receive signals from, the base station 5 via at least one antenna 33. The MTC device 3 may also include a user interface 35 which allows a user to interact with the MTC device 3 (if appropriate).

The operation of the transceiver circuit 31 is controlled by a controller 37 in accordance with software stored in memory 39. The software includes, among other things, an operating system 41, a communication control module 43, an MTC module 45, a search space module 47, and an RRC module 49.

The communication control module 43 is operable for managing communication with the base station 5. The MTC module 45 is responsible for performing machine-type communication procedures (e.g. sending/receiving data relating to automated operations, such as measurements, data collection, and/or the like).

The search space module 47 is responsible for monitoring assigned search space(s) for M-PDCCH data (e.g. scheduling allocations/DCI) transmitted for the MTC device 3. The search space module 47 determines the starting subframe and the periodicity of the correct UESS for this MTC device 3 based on higher layer signalling from the base station 5 (e.g. RRC signalling obtained via the RRC module 49).

The RRC module 49 is responsible for handling (generating, sending, and receiving) signalling messages conforming to the RRC protocol. Such RRC signalling messages may include, for example, messages relating to configuring search spaces (e.g. M-PDCCH UESS, M-PDCCH CSS, and/or the like).

<Base Station>

Figure 5:
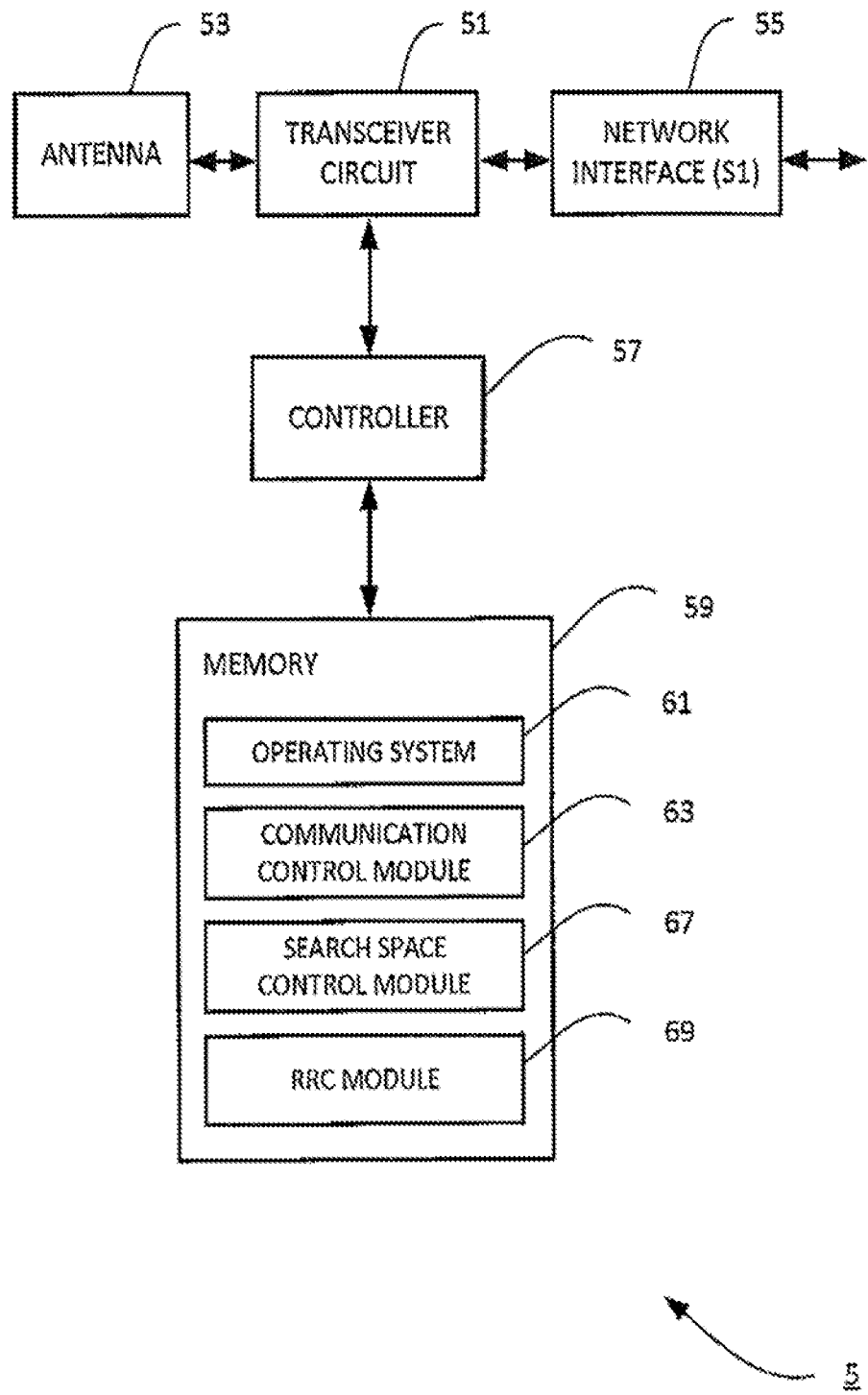
FIG. 5 shows a simplified block diagram of a base station for the telecommunication system of FIG. 1.

FIG. 5 is a block diagram illustrating the main components of the base station 5 shown in FIG. 1. The base station 5 comprises a transceiver circuit 51 which is operable to transmit signals to, and to receive signals from, the MTC device 3 (and/or other user equipment) via one or more antennas 53. The base station 5 is also operable to transmit signals to and to receive signals from the core network 7 via a network interface 55 (e.g. an 'S1' interface). The operation of the transceiver circuit 51 is controlled by a controller 57 in accordance with software stored in memory 59.

The software includes, among other things, an operating system 61, a communication control module 63, a search space control module 67, and an RRC module 69.

The communication control module 63 is operable to control communication with the MTC device 3. The communication control module 63 is also responsible for scheduling the resources of the cell 6 served by this base station 5 (e.g. using appropriately formatted DCIs).

The search space control module 67 is responsible for allocating appropriate search space(s) for each MTC device 3 served by the base station 5, and for transmitting appropriate information, to each MTC device 3 served by the base station 5, for determining the correct starting subframe and the periodicity of the allocated search space(s) to be monitored by that MTC device 3. Such information may be transmitted using higher layer signalling (e.g. RRC signalling via the RRC module 69). The search space control module 67 is also responsible for ensuring that M-PDCCH data (e.g. scheduling allocations/DCI) for a particular MTC device 3 is transmitted over the appropriate search space(s) for that MTC device 3.

The RRC module 69 is responsible for handling (generating, sending, and receiving) signalling messages conforming to the RRC protocol. Such RRC signalling messages may include, for example, messages relating to configuring search spaces (e.g. M-PDCCH UESS, M-PDCCH CSS, and/or the like).

In the above description, the MTC device 3 and the base station 5 are described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

<Operation>

Figure 6:
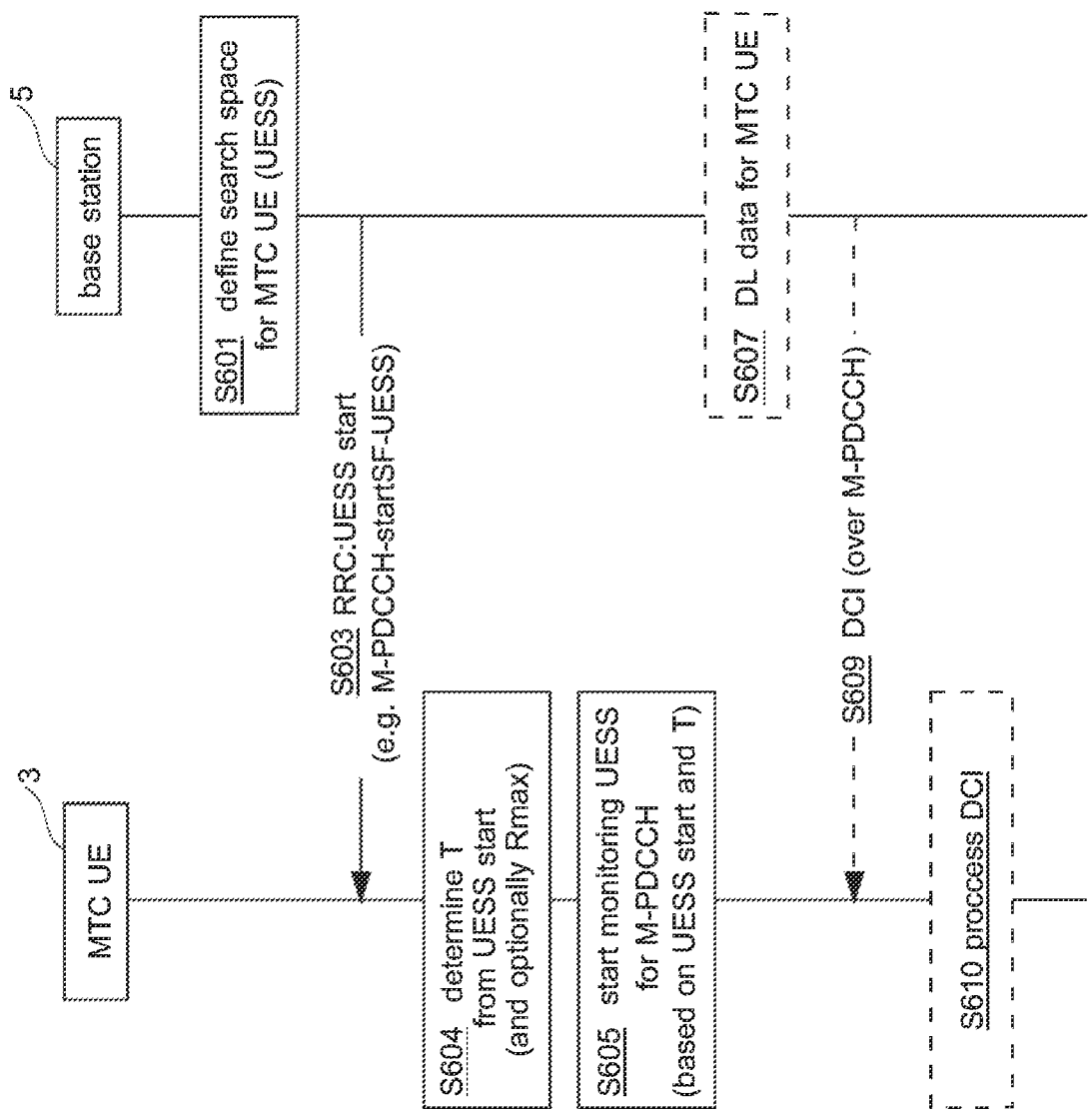
FIG. 6 is an exemplary signalling (timing) diagram illustrating an embodiment of the invention.

FIG. 6 is an exemplary signalling (timing) diagram illustrating an example embodiment of the invention.

Beneficially, in a first example, the base station 5 derives (using its search space control module 67) an associated parameter R defining the number of M-PDCCH repetitions required for that MTC device 3 (e.g. in dependence on a level of coverage enhancement required and the number of valid/invalid subframes). The base station 5 also defines (using its search space control module 67) the applicable periodicity for the M-PDCCH search space by reference to a set of values of 'R' normally used for determining the M-PDCCH repetitions for a particular MTC device 3 (e.g. the set of values R including the values 1, 2, 4, 8, 16, 32, 64, 128, and 256). This is generally illustrated in step S601.

In more detail, the base station 5 uses eight predetermined values from the set of R values (e.g. the last eight values, excluding the value '1') and each MTC device 3 can be configured with one of eight possible periodicities (T) from the set of T including the values 2, 4, 8, 16, 32, 64, 128, and 256. In other words, the value of the periodicity T for a particular MTC device 3 matches the value of R for that MTC device 3 (for values other than R=1).

In this example, therefore, the base station 5 is configured to use a smaller subset of eight of these values normally used for determining the M-PDCCH repetitions thereby allowing the three bit parameter indicating the starting subframe to represent one of the eight possible periodicities. Hence, each MTC device 3 can be configured, using the three bit parameter, with one of the set of $$T \in \{2,4,8,16,32,64,128,256\}. \quad [\text{Math. 8}]$$

However, the base station 5 may also be configured to take into account the presence of invalid downlink subframes and ensure that the value for T is at least equal to the actual subframe duration of Rmax for that MTC device 3. For example, if Rmax=8 for a particular MTC device 3 and there are one or more invalid subframes per system frame (i.e. subframes that cannot be used for M-PDCCH transmission), then the periodicity should be increased to at least to the next value (i.e. to '16' in this example).

It will be appreciated that, whilst this example is particularly simple and efficient, a potential issue may arise when the number of coverage enhancement repetitions is at its maximum (256). Specifically, in this case the periodicity T would need to be set to 256 subframes as well because otherwise the period between search spaces would be less than the possible duration of the M-PDCCH repetitions. However, when there are any invalid downlink subframes within the 256 subframe period these cannot be used for a M-PDCCH repetition and so when the maximum number of repetitions is used (256), the duration of the repetitions would extend beyond, and hence overlap with, the 256 subframe period T between search spaces.

As generally shown in step S603, the base station 5 transmits (using its RRC module 69), to each MTC device 3, information identifying the parameters R and T applicable for that MTC device 3. It will be appreciated that the information identifying the parameter T may be transmitted using a suitable information element of an RRC message. For example, if there are eight (or less) possible values for the parameter T, then the information identifying the parameter T may comprise 3 bits. The index of the chosen element may be indicated by the higher layer parameter M-PDCCH-startSF-UESS and/or the like. It will also be appreciated that the parameters R and T may be signalled in separate messages and/or separate information elements.

Each MTC device 3 thus receives (e.g. using its RRC module 49) the information identifying the parameters R and T applicable for that MTC device 3 and, using its search space module 47, it derives (based on the received parameters) and stores (in memory 39) the periodicity and the starting subframe for the UESS to be monitored by that MTC device 3 (step S604). As generally shown in step S605, the MTC device 3 starts monitoring the appropriate UESS for M-PDCCH transmissions (based on UESS start and T).

It will be appreciated that when Rmax=256, it is not possible to configure a T value that accounts for the presence of invalid subframes, i.e. a T value that is higher than 25 (when $$T \in \{2,4,8,16,32,64,128,256\} \quad [\text{Math. 9}]$$

is used). Therefore, in a variant of the first example, the value '256' may be replaced with '512' in order to accommodate the presence of invalid subframes (at Rmax=256), thus resulting in $$T \in \{2,4,8,16,32,64,128,512\}. \quad [\text{Math. 10}]$$

In this variation, therefore, when the number of coverage enhancement repetitions is at its maximum (256) the base station can signal (ins step S603), via the three bit parameter indicating the starting subframe, a periodicity T that will be greater than the duration, in subframes, of the repetitions of the M-PDCCH regardless of the presence of invalid downlink subframes. This can therefore be used to ensure that the duration the M-PDCCH repetitions does not extend beyond the period T between search spaces (when at least half the downlink subframes are valid).

In other words, in the first example, the starting subframe of the M-PDCCH search space (UESS) for a particular MTC device 3 to monitor is a subframe for which the formula $$(10n_f + \lfloor n_s/2 \rfloor) \bmod T = 0 \quad [\text{Math. 11}]$$

is satisfied, where $$T \in \{2,4,8,16,32,64,128,512\}; \quad [\text{Math. 12}]$$

$n_f$ is the radio frame index; $n_s$ is the slot index (within that frame);

$$\lfloor x \rfloor \quad [\text{Math. 13}]$$

is a flooring function (i.e. the largest integer not greater than 'x'); and where the index of the chosen element T is signalled by the higher layer parameter M-PDCCH-startSF-UESS.

It will be appreciated that for Rmax=1, there is no need to explicitly configure a starting subframe periodicity for M-PDCCH, because in this case the MTC device 3 may assume that it needs to monitor every valid downlink subframe for its M-PDCCH search space.

Beneficially, in a second example, the base station 5 defines (using its search space control module 67) the applicable periodicity for the M-PDCCH search space by reference both to the maximum number of coverage enhancement repetitions, Rmax, for an MTC device and the higher layer three bit parameter to indicate the starting subframe of the M-PDCCH UESS (M-PDCCH-startSF-UESS). Specifically, in this example, one of the possible values of the three bit parameter (e.g. M-PDCCH-startSF-UESS having a value selected from the values 0, 1, 2, 3, 4, 5, 6, and 7) is configured for a particular MTC device 3 and the M-PDCCH periodicity T is defined as an appropriate function of the selected value and Rmax (e.g. T=Rmax*(M-PDCCH-startSF-UESS+1)).

In this case, therefore, the base station 5 is configured to transmit information identifying the value of M-PDCCH-startSF-UESS for a particular MTC device 3, based on which the MTC device 3 can derive (using its search space module 47) the periodicity T and hence the starting subframe for its UESS.

For the second example, the starting subframe of the M-PDCCH search space (UESS) for a particular MTC device 3 to monitor is a subframe for which the formula $$(10n_f + \lfloor n_s/2 \rfloor) \mod T = 0 \qquad \text{[Math. 14]}$$

is satisfied, where T=Rmax*(M-PDCCH-startSF-UESS+1) and $$R\max \in \{1,2,4,8,16,32,64,128,256\}. \qquad \text{[Math. 15]}$$

However, whilst this second example has benefits in terms of simplicity, when the system frame number (SFN) counter wraps around (on reaching its maximum value which is currently 1024) some of the possible periodicities may result in the starting subframe of a search space coinciding with a repetition of an M-PDCCH of an earlier search space.

In a beneficial variant of the second example, therefore, the base station 5 is configured to ensure that the periodicity T is always (or almost always) a sub-multiple of 10240 (i.e. the total number of subframes in 1024 system frames). Beneficially, this helps periodicities to be avoided that might otherwise result in a search space starting in the middle of a repetition. Specifically, the base station 5 is configured to define (using its search space control module 67) a periodicity to reduce the number of factors other than 2 and 5. In this variant a set of eight possible factors (herein denoted 'G') are defined and the M-PDCCH periodicity T is defined as Rmax*G. The choice of G (i.e. the index identifying which of the eight values is to be used) is signalled (in step S603) using the three bit parameter (e.g. M-PDCCH-startSF-UESS) for signalling the starting subframe of the search space.

One possible set of values for G is as follows $$G \in \{1,2,4,5,8,10,16,20\}. \qquad \text{[Math. 16]}$$

This set of values can result in one periodicity that is not a factor of 10240

$$(\text{i.e. } G=16, R\max=256 \rightarrow T=4096). \qquad \text{[Math. 17]}$$

Another possible set of values for G is as follows $$G \in \{1,2,4,5,8,10,40\}. \qquad \text{[Math. 18]}$$

This avoids all periodicities that are not factors of 10240 but does result in a significantly longer maximum periodicity $$(\text{e.g. } G=40, R\max=256 \rightarrow T=10240). \qquad \text{[Math. 19]}$$

Each MTC device 3 receives (e.g. using its RRC module 49) the information identifying the parameter G applicable for that MTC device 3, based on which it derives (using its search space module 47) the periodicity T and the starting subframe for the UESS to be monitored by that MTC device 3.

In other words, in this variant, the starting subframe of the M-PDCCH search space (UESS) for a particular MTC device 3 to monitor is a subframe for which the formula $$(10n_f + \lfloor n_s/2 \rfloor) \mod T = 0 \qquad \text{[Math. 20]}$$

is satisfied, where T=Rmax*G, $$G \in \{1,2,4,5,8,10,16,20\} \text{ or } G \in \{1,2,4,5,8,10,20,40\}, \qquad \text{[Math. 21]}$$

where the index of the chosen element T is signalled by the higher layer parameter M-PDCCH-startSF-UESS, and $$R\max \in \{1,2,4,8,16,32,64,128,256\}. \qquad \text{[Math. 22]}$$

As generally shown in steps S607 to S610, whenever the base station 5 needs to schedule downlink data for a particular MTC device 5, it generates (using its communication control module 63) an appropriately formatted DCI data (in step S607). In step S609, the base station 5 then transmits (using its RRC module 69) the DCI data over the search space (UESS) associated with the MTC device 3 for which the DCI data is intended. The MTC devices 3 (which started monitoring its allocated search space in step S605) receives and decodes the DCI data (as generally shown in step S610). Steps S607 to S610 may be repeated whenever the base station 5 needs to schedule downlink data for a particular MTC device 5. Steps S601 to S605 may be repeated whenever the base station 5 needs to update the search space for a particular MTC device 5.

<Modifications and Alternatives>

Detailed example embodiments have been described above. As those skilled in the art will appreciate, a number of modifications and alternatives can be made to the above example embodiments and variations whilst still benefiting from the inventions embodied therein.

It will be appreciated that although the communication system 1 is described in terms of base stations 5 operating as E-UTRAN base stations, the same principles may be applied to base stations operating as macro or pico base stations, femto base stations, relay nodes providing elements of base station functionality, home base stations (HeNB), or other such communication nodes.

In the above description, the information element M-PDCCH-startSF-UESS is used as an exemplary information element relating to the starting subframe of the UESS. However, it will be appreciated that any other suitable information element may be used. Moreover, it will also be appreciated that information relating to the starting subframe of the UESS may also be provided implicitly, i.e. without sending any (additional) information element. For example, the starting subframe of the UESS may be derived from the number of repetitions/coverage enhancement required by the MTC device.

It will be appreciated that different MTC devices (or UEs) with the same or with different starting subframe periodicities may be configured to monitor the same search space. Furthermore, it will be appreciated that a similar signaling method for starting subframe periodicities may also be defined for the other search spaces Type0-M-PDCCH CSS and Type1-M-PDCCH CSS. In this case, it will be appreciated that the above described examples may be applicable for Type1-M-PDCCH CSS by replacing M-PDCCH-startSF-UESS with an information element relating to the starting subframe of the CSS (e.g. 'M-PDCCH-startSF-CSS-RA-r13' and/or the like). The values of r1, r2, r3, and r4 applicable for Type1-M-PDCCH CSS are given in Table 2.

TABLE 2

Determination of repetition levels for Type1-M-PDCCH CSS

| $R_{max}$ | r1 | r2 | r3 | r4 |
| --- | --- | --- | --- | --- |
| 256 | 2 | 16 | 64 | 256 |
| 128 | 2 | 16 | 64 | 128 |

TABLE 2-continued

Determination of repetition levels for Type1-M-PDCCH CSS

| $R_{max}$ | r1 | r2 | r3 | r4 |
|---|---|---|---|---|
| 64 | 2 | 8 | 32 | 64 |
| 32 | 1 | 4 | 16 | 32 |
| 16 | 1 | 4 | 8 | 16 |
| 8 | 1 | 2 | 4 | 8 |

Although in FIG. 3, three eCCE areas are shown, it will be appreciated that there might be a different number of eCCEs defined in one subframe, and that the number of eCCEs might vary from subframe to subframe.

In the above example embodiments, a mobile telephone based telecommunication system was described. As those skilled in the art will appreciate, the signalling techniques described in the present application can be employed in other communication system. Other communication nodes or devices may include user devices such as, for example, personal digital assistants, laptop/tablet computers, web browsers, e-book readers etc. As those skilled in the art will appreciate, it is not essential that the above described relay system be used for mobile communication devices. The system can be used to extend the coverage of base stations in a network having one or more fixed computing devices as well as or instead of the mobile communicating devices.

In the example embodiments described above, the base stations 5 and MTC devices 3 each include transceiver circuitry. Typically, this circuitry will be formed by dedicated hardware circuits. However, in some example embodiments, part of the transceiver circuitry may be implemented as software run by the corresponding controller.

In the above example embodiments, a number of software modules were described. As those skilled in the art will appreciate, the software modules may be provided in compiled or un-compiled form and may be supplied to the base station or the MTC device as a signal over a computer network, or on a recording medium. Further, the functionality performed by part or all of this software may be performed using one or more dedicated hardware circuits.

The base station and/or the communication device may comprise a memory for holding data representing a plurality of periodicities, and said parameter may identify which of said plurality of periodicities said search space is characterised by (e.g., the periodicity, T, is defined as $$T \in \{2,4,8,16,32,64,128,512\}).$$ [Math. 23]

A level of coverage enhancement (e.g. a maximum number of repetitions, 'Rmax') may be configured for the at least one communication device, and the periodicity may be related to both said parameter and said level of coverage enhancement (e.g. by a mathematical expression).

The periodicity may be related to said parameter and said level of coverage enhancement by the mathematical expression:

$$T = R\max^*(M\text{-PDCCH-startSF-UESS}+1)$$

where Rmax represent a maximum number of repetitions configured for the communication device (e.g. $R\max \in \{1,2,4,8,16,32,64,128,256\}$); [Math. 24]

and M-PDCCH-startSF-UESS is the parameter.

The base station and/or the communication device may comprise a memory for holding data representing a plurality of factors for use in deriving said periodicity, wherein said parameter identifies one factor of said plurality factors, and the periodicity may be related to the identified factor (e.g. by a mathematical expression).

A level of coverage enhancement (e.g. a maximum number of repetitions, 'Rmax') may be configured for the communication device, and said periodicity may be related to both said identified factor and said level of coverage enhancement (e.g. by a mathematical expression).

The periodicity may be related to said factor and said level of coverage enhancement by the mathematical expression:

$$T = R\max^* G$$

where Rmax represent a maximum number of repetitions configured for the communication device (e.g. $R\max \in \{1,2,4,8,16,32,64,128,256\}$); [Math. 25]

and G represents the identified factor (e.g. $G \in \{1,2,4,5,8,10,16,20\}$ or $G \in \{1,2,4,5,8,10,20, 40\}$). [Math. 26]

The search space may comprise one of: a machine-type communication (MTC) device specific search space (e.g. a UESS); and a common search space (e.g. a Type0-M-PDCCH CSS or a Type1-M-PDCCH CSS).

The parameter may be transmitted using an appropriately formatted information element (e.g. an 'M-PDCCH-startSF-UESS' information element or an 'M-PDCCH-startSF-CSS-RA-r13' information element).

The processor of the base station and/or the communication device may be configured to determine said starting subframe of said search space using the formula:

$$(10n_f + \lfloor n_s/2 \rfloor) \bmod T = 0$$ [Math. 27]

where T is the periodicity; $n_f$ represents an index of a radio frame comprising said starting subframe; $n_s$ represents a slot index of said starting subframe;

$$\lfloor x \rfloor$$ [Math. 28]

is a flooring function (i.e. the largest integer not greater than 'x').

The communication device may comprise a machine-type communication device (MTC device).

Various other modifications will be apparent to those skilled in the art and will not be described in further detail here.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

1. INTRODUCTION

In Rel-13, a LC/CE MTC UE monitors one or more search spaces on one or more narrowbands:
Type0-MPDCCH common search space (Only for ModeA) that can be used for TPC command, "PDCCH order" to initiate random access procedure and fall back for unicast PDSCH/PUSCH
Type1-MPDCCH common search space used for scheduling the Paging transmission
Type2-MPDCCH common search space used for scheduling RAR, Msg3 retransmission and Msg4
MPDCCH UE-specific search space (USS) used for scheduling unicast PDSCH and PUSCH transmissions.

A LC/CE UE is not required to simultaneously monitor MPDCCH USS and Type1-MPDCCH common search space, and MPDCCH USS and Type2-MPDCCH common search space.

The starting subframes for Type1-MPDCCH common search space is determined from locations of paging opportunity subframes.

The starting subframe(s) for Type2-MPDCCH common search space is explicitly indicated in MTC-SIB using 3-bits.

The starting subframe(s) for MPDCCH USS and Type0-MPDCCH common search space is higher layer configured via RRC using 3-bits.

In this contribution, we discuss the details of the starting subframes for MPDCCH USS, Type0-MPDCCH CSS and Type1-MPDCCH CSS for Rel-13 MTC.

2. STARTING SUBFRAMES FOR USS SEARCH SPACE

Figure 9:
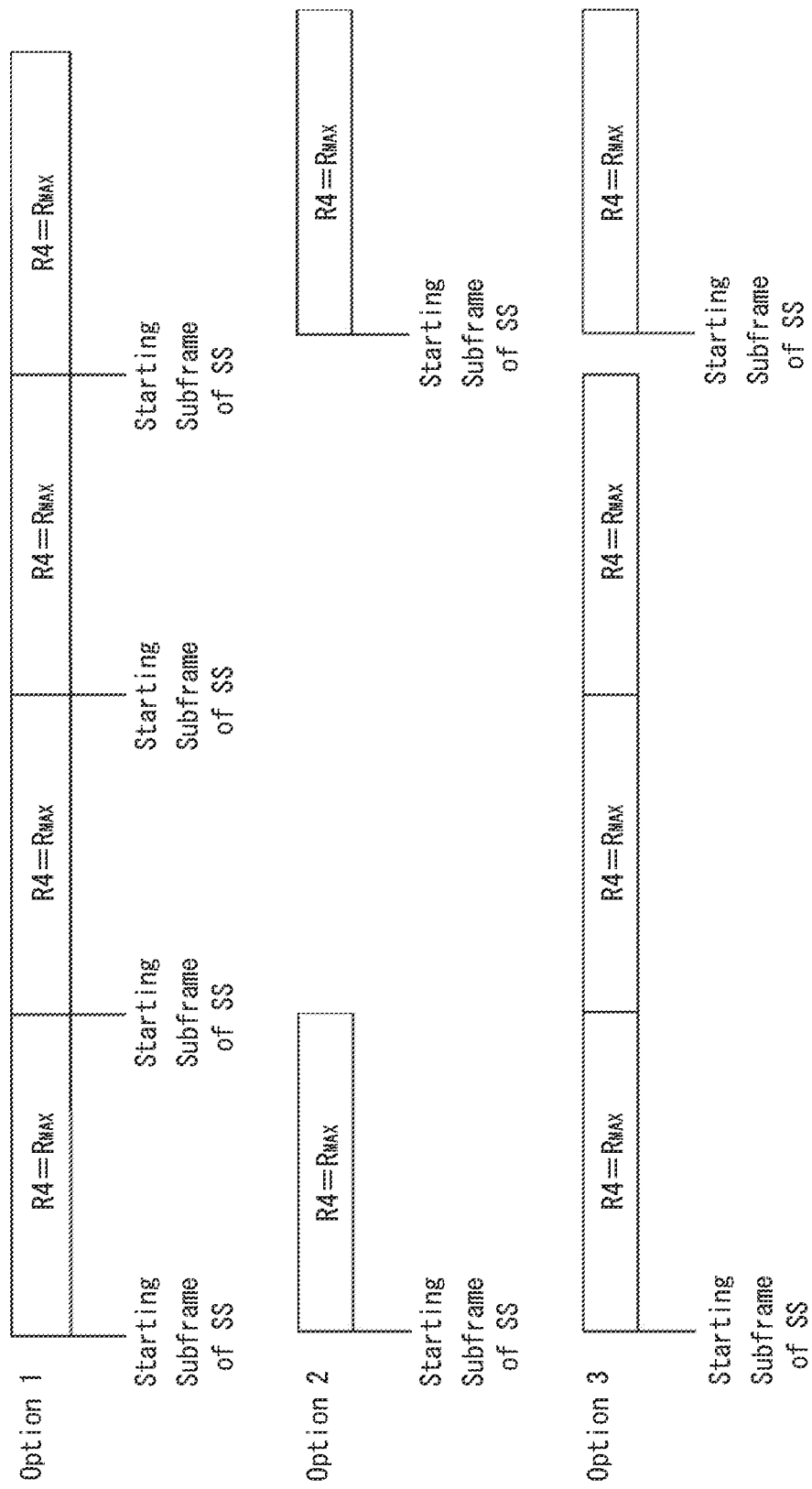
FIG. 9 illustrates exemplary options for starting subframes of a search space.

In the last RAN1 meeting, three options were discussed for the structure of the M-PDCCH USS as shown in FIG. 9. Option 2 was agreed where the periodicity of starting subframes of USS can be longer than the maximum number of the repetition (Rmax) [2].

Agreement:

The relation between starting subframes and maximum number of R is

Option 2: The periodicity of starting subframes of UE-SS can be longer than maximum number of R. Only one SS occurs after the starting subframe of UE-SS.

Note: the duration between the two adjacent starting subframes should be no less than the actual subframe duration of the maximum number of R FFS whether R_max=1 is supported, and if so, the starting subframes for this case The possible starting subframes for M-PDCCH search space are defined regardless of valid/invalid DL subframe(s)

Further agreement from RAN1 is as follows:

Agreement:

For starting subframe for USS,

Separate RRC parameter:

RAN1 recommends to have [3] bit for the signalling, and kindly ask RAN2 to specify the details of the signalling From the above agreements, it is clear that there is a periodicity that needs to be specified and signaled to each UE about M-PDCCH USS search space. RAN1 recommended RAN2 to specify the signaling, but, there is no LS sent to RAN2 except the RRC parameters. In addition, the higher layer signaling parameter mpdcch-StartSF-UESS-r13 for starting subframe for MPDCCH USS has been captured in RAN1 specifications, more specifically in TS 36.213. However, the details of possible values for starting subframes and their relation with system frame number (SFN) and subframe number has not been captured in any of the specifications.

The following description was captured in TS 36.213 section 9.1.5 [3]:

"Locations of starting subframe k are determined from higher layer configured subframe k0, and are given by k=$k_b$ where $k_b$ is the b" consecutive LC/CE DL subframe from k0, and $$b = u \cdot rj, \text{ and } u = 0, 1, \ldots \frac{r_{max}}{rj} - 1, \text{ and } j \in \{1, 2, 3, 4\}, \quad \text{[Math. 29]}$$

where

For MPDCCH UE-specific search space, and Type0-common search space, k0 is given by the higher layer parameter mPDCCH-startSF-UESS, $r_{max}$ is given by higher layer parameter mPDCCH-NumRepetition, and r1, r2, r3, r4 are given in Table 9.1.5-3."

In order to understand the above description, we give some examples as shown in FIGS. 7 and 8 where different periodicities of the starting subframes T, Rmax=8 and some valid subframes (v) are considered.

As the number of bits agreed for the signaling is limited to 3 bits (0 to 7), the open issue is how to utilize these number of bits to define a set of periodicity for M-PDCCH search space.

Three options are described as follows:

Option 1:

To reuse the candidate set of R {1, 2, 4, 8, 16, 32, 64, 128, 256} already defined M-PDCCH repetitions excluding the first element. This means that a UE can be configured one of eight possible periodicities $$T \in \{2,4,8,16,32,64,128,256\} \quad \text{[Math. 30]}$$

provided that T is not less than the actual subframe duration of Rmax. For example, if Rmax=8 for a UE and there are five invalid subframes, then the periodicity should be increased at least to 16 as shown on FIG. 7.

One issue will be when the periodicity equals 256 and Rmax=256, and there are some invalid subframes in the system, there is no a higher number than 256 that can be configured. Therefore, in order to accommodate the invalid subframes when the periodicity equals 256 it may be better to replace 256 with 512. The drawback is that when the ratio of DL valid subframes are less than half, the configuration of T=512 does not have room for all repetitions when Rmax=256.

For this option, the starting subframe for a UE to monitor the M-PDCCH search space should satisfy as $$(10n_f + \lfloor n_s/2 \rfloor) \bmod T = 0 \quad \text{[Math. 31]}$$

where $$T \in \{2,4,8,16,32,64,128,512\} \quad \text{[Math. 32]}$$

and the index of the chosen element is given by the higher layer parameter mPDCCH-startSF-UESS. $n_f$ is system frame number (SFN) and $$\lfloor n_s/2 \rfloor \quad \text{[Math. 33]}$$

corresponds to subframe number.

For the case Rmax=1, there is no need to configure a starting subframe periodicity for MPDCCH, since UE can assume to monitor every valid downlink subframe for MPDCCH search space.

Option 2:

To apply the UE specific parameter of Rmax and the higher layer parameter mPDCCH-startSF-UESS. In this case the values of mPDCCH-startSF-UESS can be set to {0, 1, 2, 3, 4, 5, 6, 7} and one value is configured to the UE. Then for each UE, the M-PDCCH periodicity T can be defined as Rmax*(mPDCCH-startSF-UESS+1).

For this option, the starting subframe for a UE to monitor the M-PDCCH search space should satisfy as $$(10n_f + \lfloor n_s/2 \rfloor) \bmod T = 0 \qquad \text{[Math. 34]}$$

where $$T = R\max*(\text{mPDCCH-startSF-UESS} + 1) \text{ and}$$

$$R\max \in \{1,2,4,8,16,32,64,128,256\}. \qquad \text{[Math. 35]}$$

However, drawback is that not all periodicities T are starting on the same subframe as some T values are not factors of 10240 (SFN 1024×10 subframes). In addition, the condition $$(10n_f + \lfloor n_s/2 \rfloor) \bmod T = 0 \qquad \text{[Math. 36]}$$

will allow some periodicities T to start in the middle of repetition during wrapping around of the SFN counter. This can be avoided by specifying not to allow a new periodicity to start in the middle of ongoing repetition for the UE.

Option 3:

To improve Option 2, we have to ensure the periodicity T is a sub-multiple of 10240 which means we should avoid anything that contains factors other than 2 and 5. So, based on this we can define a list of factors as $$G \in \{1,2,4,5,8,10,16,20\} \qquad \text{[Math. 37]}$$

and the index of the chosen element is given by the higher layer parameter mPDCCH-startSF-UESS.

Therefore, the starting subframe for a UE to monitor the M-PDCCH search space should satisfy as $$(10n_f + \lfloor n_s/2 \rfloor) \bmod T = 0 \qquad \text{[Math. 38]}$$

where T=Rmax*G, $$G \in \{1,2,4,8,10,16,20\} \qquad \text{[Math. 39]}$$

and the index of the chosen element is given by the higher layer parameter mPDCCH-startSF-UESS, and $$R\max \in \{1,2,4,8,16,64,128,256\}. \qquad \text{[Math. 40]}$$

It should be noted that different UEs with same or different starting subframe periodicities can monitor on the same search space.

Furthermore, similar signaling method for starting subframe periodicities should be defined for other search spaces of Type0-MPDCCH CSS and Type1-MPDCCH CSS.

Proposal 1: Capture the higher layer signaling of starting subframes for MPDCCH USS and Type0-MPDCCH CSS in TS 36.213 as follows:

For MPDCCH UE-specific search space, and Type0-MPDCCH common search space, k0 is given by $$(10n_f + \lfloor n_s/2 \rfloor) \bmod T = 0, \qquad \text{[Math. 41]}$$

where
Option 1:

$$T \in \{2,4,8,16,32,64,128,512\} \qquad \text{[Math. 42]}$$

and the index of one element is given by the higher layer parameter mPDCCH-startSF-UES S.
Option 3: T=Rmax*G, $$G \in \{1,24,5,8,10,20,40\} \qquad \text{[Math. 43]}$$

and the index of one element is given by the higher layer parameter mPDCCH-startSF-UES S.

Proposal 2: Define same signaling method for Type1-MPDCCH CSS by replacing mPDCCH-startSF-UESS with mpdcch-startSF-CSS-RA-r13.

3. CONCLUSION

In this contribution, we have discussed the starting subframe periodicity for MPDCCH search spaces. We have the following proposals:

Proposal 1: Capture the higher layer signaling of starting subframes for MPDCCH USS and Type0-MPDCCH CSS in TS 36.213 as follows:

For MPDCCH UE-specific search space, and Type0-MPDCCH common search space, k0 is given by $$(10n_f + \lfloor n_s/2 \rfloor) \bmod T = 0, \qquad \text{[Math. 44]}$$

where
Option 1:

$$T \in \{2,4,8,16,64,128,512\} \qquad \text{[Math. 45]}$$

and the index of one element is given by the higher layer parameter mPDCCH-startSF-UES S.
Option 3: T=Rmax*G, $$G \in \{1,2,4,5,8,10,16,20\} \qquad \text{[Math. 46]}$$

and the index of one element is given by the higher layer parameter mPDCCH-startSF-UES S.

Proposal 2: Define same signaling method for Type1-MPDCCH CSS by replacing mPDCCH-startSF-UESS with mpdcch-startSF-CSS-RA-r13.

4. REFERENCES

1) R1-157891 LS on RRC parameters for LTE eMTC
2) Chairman's Notes RAN1_83-final
3) TS 36.213 V13.0.0

The whole or part of the example embodiments disclosed above can be described as, but not limited to, the following supplementary notes.

(Supplementary note 1) A base station for communicating with a plurality of communication devices in a cellular communication system, the base station comprising:
a processor configured to:
define a search space in which at least one communication device, of said plurality of communication devices, can search for control information, wherein the search space is characterised by an initial starting subframe representing a start of the search space and a periodicity representing a time period between respective starting subframes of a plurality of portions of the search space, each portion representing a different candidate for the transmission of control information; and
generate a parameter configured to indicate both the initial starting subframe and the periodicity to the at least one communication device; and
a transceiver configured to transmit said parameter to said communication device.

(Supplementary note 2) The base station according to Supplementary note 1, comprising a memory for holding data representing a plurality of periodicities, and wherein said parameter identifies which of said plurality of periodicities said search space is characterised by (e.g. the periodicity, T, is defined as $$T \in \{2,4,8,16,32,64,128,512\}). \qquad \text{[Math. 47]}$$

(Supplementary note 3) The base station according to Supplementary note 1, wherein a level of coverage enhancement (e.g. a maximum number of repetitions, 'Rmax') is configured for the at least one communication device, and wherein said periodicity is related to both said parameter and said level of coverage enhancement (e.g. by a mathematical expression).

(Supplementary note 4) The base station according to Supplementary note 3, wherein said periodicity is related to said parameter and said level of coverage enhancement by the mathematical expression:

$$T=R\text{max}*(M\text{-PDCCH-startSF-UESS}+1)$$

where Rmax represent a maximum number of repetitions configured for the communication device (e.g. $R\text{max} \in \{1,2,4,8,16,32,64,128,256\}$); [Math. 48]

and M-PDCCH-startSF-UESS is the parameter.

(Supplementary note 5) The base station according to Supplementary note 1, comprising a memory for holding data representing a plurality of factors for use in deriving said periodicity, wherein said parameter identifies one factor of said plurality factors, and wherein said periodicity is related to the identified factor (e.g. by a mathematical expression).

(Supplementary note 6) The base station according to Supplementary note 5, wherein a level of coverage enhancement (e.g. a maximum number of repetitions, 'Rmax') is configured for the at least one communication device, and wherein said periodicity is related to both said identified factor and said level of coverage enhancement (e.g. by a mathematical expression).

(Supplementary note 7) The base station according to Supplementary note 6, wherein said periodicity is related to said factor and said level of coverage enhancement by the mathematical expression:

$$T=R\text{max}*G$$

where Rmax represent a maximum number of repetitions configured for the communication device (e.g. $R\text{max} \in \{1,2,4,8,16,32,64,128,256\}$); [Math. 49]

and G represents the identified factor (e.g. $G \in \{1,2,4,5,8,10,16,20\}$ or $G \in \{1,2,4,5,8,10,20,40\}$). [Math. 50]

(Supplementary note 8) The base station according to any one of Supplementary notes 1 to 7, wherein said search space comprises one of: a machine-type communication (MTC) device specific search space (e.g. a UESS); and a common search space (e.g. a Type0-M-PDCCH CSS or a Type1-M-PDCCH CSS).

(Supplementary note 9) The base station according to any one of Supplementary notes 1 to 8, wherein said parameter is transmitted using an appropriately formatted information element (e.g. an 'M-PDCCH-startSF-UESS' information element or an 'M-PDCCH-startSF-CSS-RA-r13' information element).

(Supplementary note 10) The base station according to any one of Supplementary notes 1 to 9, wherein said processor is configured to determine said starting subframe of said search space using the formula:

$$(10n_f+\lfloor n_s/2 \rfloor)\text{mod } T=0$$ [Math. 51]

where T is the periodicity; $n_f$ represents an index of a radio frame comprising said starting subframe; $n_s$ represents a slot index of said starting subframe;

$$\lfloor x \rfloor$$ [Math. 52]

is a flooring function (i.e. the largest integer not greater than 'x').

(Supplementary note 11) A communication device for communicating with a base station of a cellular communication system, the communication device comprising:
 a transceiver configured to receive a parameter configured to indicate both an initial starting subframe representing a start of a search space and a periodicity representing a time period between respective starting subframes of a plurality of portions of the search space, each portion representing a different candidate for the transmission of control information; and
 a processor configured to determine, from said received parameter, the search space in which said transceiver can search for control information.

(Supplementary note 12) The communication device according to Supplementary note 11, comprising a memory for holding data representing a plurality of periodicities, and wherein said parameter identifies which of said plurality of periodicities said search space is characterised by (e.g. the periodicity, T, is defined as $$T \in \{2,4,8,16,32,64,128,512\}$$ [Math. 53]

(Supplementary note 13) The communication device according to Supplementary note 11, wherein a level of coverage enhancement (e.g. a maximum number of repetitions, 'Rmax') is configured for said communication device, and wherein said periodicity is related to both said parameter and said level of coverage enhancement (e.g. by a mathematical expression).

(Supplementary note 14) The communication device according to Supplementary note 13, wherein said periodicity is related to said parameter and said level of coverage enhancement by the mathematical expression:

$$T=R\text{max}*(M\text{-PDCCH-startSF-UESS}+1)$$

where Rmax represent a maximum number of repetitions configured for the communication device (e.g. $R\text{max} \in \{1,2,4,8,16,32,64,128,256\}$); [Math. 54]

and M-PDCCH-startSF-UESS is the parameter.

(Supplementary note 15) The communication device according to Supplementary note 11, comprising a memory for holding data representing a plurality of factors for use in deriving said periodicity, wherein said parameter identifies one factor of said plurality factors, and wherein said periodicity is related to the identified factor (e.g. by a mathematical expression).

(Supplementary note 16) The communication device according to Supplementary note 15, wherein a level of coverage enhancement (e.g. a maximum number of repetitions, 'Rmax') is configured for the at least one communication device, and wherein said periodicity is related to both said identified factor and said level of coverage enhancement (e.g. by a mathematical expression).

(Supplementary note 17) The communication device according to Supplementary note 16, wherein said periodicity is related to said factor and said level of coverage enhancement by the mathematical expression:

$$T=R\text{max}*G$$

where Rmax represent a maximum number of repetitions configured for the communication device (e.g. $R\max\in\{1,2,4,8,16,32,64,128,256\}$); [Math. 55]

and G represents the identified factor (e.g. $G\in\{1,2,4,5,8,10,16,20\}$ or $G\in\{1,2,4,5,8,10,20, 40\}$). [Math. 56]

(Supplementary note 18) The communication device according to any one of Supplementary notes 11 to 17, wherein said search space comprises one of: a machine-type communication (MTC) device specific search space (e.g. a UESS); and a common search space (e.g. a Type0-M-PDCCH CSS or a Type1-M-PDCCH CSS).

(Supplementary note 19) The communication device according to any one of Supplementary notes 11 to 18, wherein said parameter is transmitted using an appropriately formatted information element (e.g. an 'M-PDCCH-startSF-UESS' information element or an 'M-PDCCH-startSF-CSS-RA-r13' information element).

(Supplementary note 20) The communication device according to any one of Supplementary notes 11 to 19, wherein said processor is configured to determine said starting subframe of said search space using the formula:

$(10n_f+\lfloor n_s/2\rfloor) \bmod T=0$ [Math. 57]

where T is the periodicity; $n_f$ represents an index of a radio frame comprising said starting subframe; $n_s$ represents a slot index of said starting subframe;

$\lfloor x \rfloor$ [Math. 58]

is a flooring function (i.e. the largest integer not greater than 'x').

(Supplementary note 21) The communication device according to any one of Supplementary notes 11 to 20, comprising a machine-type communication device (MTC device).

(Supplementary note 22) A system comprising the base station according to any one of Supplementary notes 1 to 10 and the communication device according to any one of Supplementary notes 11 to 21.

(Supplementary note 23) A method performed by a base station, the method comprising:
defining a search space in which at least one communication device, of a plurality of communication devices, can search for control information, wherein the search space is characterised by an initial starting subframe representing a start of the search space and a periodicity representing a time period between respective starting subframes of a plurality of portions of the search space, each portion representing a different candidate for the transmission of control information;
generating a parameter configured to indicate both the initial starting subframe and the periodicity to the at least one communication device; and
transmitting said parameter to said communication device.

(Supplementary note 24) A method performed by a communication device, the method comprising:
receiving a parameter configured to indicate both an initial starting subframe representing a start of a search space and a periodicity representing a time period between respective starting subframes of a plurality of portions of the search space, each portion representing a different candidate for the transmission of control information; and determining, from said received parameter, the search space in which said transceiver can search for control information.

(Supplementary note 25) A computer implementable instructions product comprising computer implementable instructions for causing a programmable communications device to perform the method of Supplementary note 23 or 24.

While the invention has been particularly shown and described with reference to example embodiments thereof, the invention is not limited to these embodiments. It will be understood by those of ordinary skill in the art that various changes in form and details may be made therein without departing from the sprit and scope of the present invention as defined by the claims.

What is claimed is:

1. A base station comprising:
a memory storing instructions; and
at least one processor configured to process the instructions to:
transmit, to a user equipment (UE), first information and second information,
the first information indicating a starting subframe configuration for a search space for a Physical Downlink Control Channel (PDCCH) and being used for giving a parameter G,
the second information indicating maximum numbers of repetitions for the search space for the PDCCH and being used for giving a parameter $r_{max}$, wherein
a starting subframe, for the search space, is determined as a subframe satisfying a condition of $(10n_f+\lfloor n_s/2\rfloor) \bmod T=0$, where
$n_f$ corresponds to a system frame number,
$n_s$ corresponds to a slot number, and $T=r_{max}\cdot G$.

2. A user equipment (UE) comprising:
a memory storing instructions; and
at least one processor configured to process the instructions to:
receive, from a base station, first information and second information,
the first information indicating a starting subframe configuration for a search space for a Physical Downlink Control Channel (PDCCH) and being used for giving a parameter G,
the second information indicating maximum numbers of repetitions for the search space for the PDCCH and being used for giving a parameter $r_{max}$, wherein
a starting subframe, for the search space, is determined as a subframe satisfying a condition of $(10n_f+\lfloor n_s/2\rfloor) \bmod T=0$, where
$n_f$ corresponds to a system frame number,
$n_s$ corresponds to a slot number, and $T=r_{max}\cdot G$.

3. A method performed by a base station, the method comprising:
transmitting, to a user equipment (UE), first information and second information,
the first information indicating a starting subframe configuration for a search space for a Physical Downlink Control Channel (PDCCH) and being used for giving a parameter G,
the second information indicating maximum numbers of repetitions for the search space for the PDCCH and being used for giving a parameter $r_{max}$, wherein a starting subframe, for the search space, is determined as a subframe satisfying a condition of $(10n_f+\lfloor n_s/2\rfloor)$ mod $T=0$, where $n_f$ corresponds to a system frame number, $n_s$ corresponds to a slot number, and $T=r_{max}\cdot G$.

4. The method according to claim 3, wherein
for a case where the search space corresponds to a UE-specific search space and for a case where the search space correspond to a first type of common search space, the parameter G is given by the first information for the UE-specific search space, and
for the case where the search space corresponds to the UE-specific search space and for the case where the search space corresponds to the first type of common search space, the parameter $r_{max}$ is given by the second information for the UE-specific search space.

5. The method according claim 3, wherein
for a case where the search space corresponds to a second type of common search space, the parameter G is given by the first information for a common search space, and
for the case where the search space corresponds to the second type of common search space, the parameter $r_{max}$ is given by the second information for the common search space.

6. A method performed by a user equipment (UE), the method comprising:
receiving, from a base station, first information and second information,
the first information indicating a starting subframe configuration for a search space for a Physical Downlink Control Channel (PDCCH) and being used for giving a parameter G,
the second information indicating maximum numbers of repetitions for the search space for the PDCCH and being used for giving a parameter $r_{max}$, wherein
a starting subframe, for the search space, is determined as a subframe satisfying a condition of $(10n_f+\lfloor n_s/2\rfloor)$ mod $T=0$, where $n_f$ corresponds to a system frame number, $n_s$ corresponds to a slot number, and $T=r_{max}\cdot G$.

7. The method according to claim 6, wherein
for a case where the search space corresponds to a UE-specific search space and for a case where the search space corresponds to a first type of common search space, the parameter G is given by the first information for the UE-specific search space, and
for the case where the search space corresponds to the UE-specific search space and for the case where the search space corresponds to the first type of common search space, the parameter $r_{max}$ is given by the second information for the UE-specific search space.

8. The method according claim 6, wherein
for a case where the search space corresponds to a second type of common search space, the parameter G is given by the first information for a common search space, and
for the case where the search space corresponds to the second type of common search space, the parameter $r_{max}$ is given by the second information for the common search space.

9. The method according to claim 6, wherein
for a case where the search space corresponds to a UE-specific search space and for a case where the search space corresponds to a first type of common search space, the parameter G is given based on the first information for the UE-specific search space, and
for the case where the search space corresponds to the UE-specific search space and for the case where the search space corresponds to the first type of common search space, the parameter $r_{max}$ is given based on the second information for the UE-specific search space.

10. The method according claim 6, wherein
for a case where the search space corresponds to a second type of common search space, the parameter G is given based on the first information for a common search space, and
for the case where the search space corresponds to the second type of common search space, the parameter $r_{max}$ is given based on the second information for the common search space.

* * * * *